United States Patent
Ikeda et al.

(10) Patent No.: US 10,545,644 B2
(45) Date of Patent: Jan. 28, 2020

(54) INFORMATION PROCESSING APPARATUS AND INFORMATION PROCESSING METHOD FOR DISPLAY CONTROL

(71) Applicant: SONY CORPORATION, Tokyo (JP)

(72) Inventors: Takuya Ikeda, Tokyo (JP); Kentaro Ida, Tokyo (JP); Yousuke Kawana, Tokyo (JP); Osamu Shigeta, Chiba (JP); Seiji Suzuki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/754,022

(22) PCT Filed: Jun. 15, 2016

(86) PCT No.: PCT/JP2016/067798
§ 371 (c)(1),
(2) Date: Feb. 21, 2018

(87) PCT Pub. No.: WO2017/043141
PCT Pub. Date: Mar. 16, 2017

(65) Prior Publication Data
US 2018/0275854 A1   Sep. 27, 2018

(30) Foreign Application Priority Data
Sep. 8, 2015   (JP) .................................. 2015-176795

(51) Int. Cl.
*G06F 3/048*   (2013.01)
*G06F 3/0484*   (2013.01)
(Continued)

(52) U.S. Cl.
CPC ........ *G06F 3/04842* (2013.01); *G06F 3/0386* (2013.01); *G06F 3/04817* (2013.01);
(Continued)

(58) Field of Classification Search
CPC .............. G06F 3/04842; G06F 3/0304; G06F 3/03542; G06F 3/0386; G06F 3/0425;
(Continued)

(56) References Cited

U.S. PATENT DOCUMENTS

2011/0310009 A1   12/2011   Ueno et al.

FOREIGN PATENT DOCUMENTS

| CN | 102331868 A | 1/2012 |
|----|-------------|--------|
| JP | 11-212724 A | 8/1999 |

(Continued)

OTHER PUBLICATIONS

International Search Report and Written Opinion of PCT Application No. PCT/JP2016/067798, dated Aug. 9, 2016, 06 pages.

*Primary Examiner* — Lisa S Landis
(74) *Attorney, Agent, or Firm* — Chip Law Group

(57) ABSTRACT

Provided is an information processing apparatus including: a processing unit configured to perform switching processing on a basis of a determination result as to whether or not a determination region determined on a basis of a display region which becomes a target of operation of one operation system includes a pointed position pointed in response to the operation, the switching processing being processing of switching between a display control mode for changing a position or a shape of the display region on a basis of the operation and an execution mode for executing processing corresponding to a display object within the display region on a basis of the operation, in which the display region indicates a unit when the position or the shape of the display region is changed in the display control mode.

18 Claims, 17 Drawing Sheets

(51) Int. Cl.
| | |
|---|---|
| *G06F 3/038* | (2013.01) |
| *G06F 3/0481* | (2013.01) |
| *G09G 5/38* | (2006.01) |
| *G06T 7/521* | (2017.01) |
| *G09G 3/00* | (2006.01) |
| *G09G 5/373* | (2006.01) |

(52) U.S. Cl.
CPC ............... *G09G 5/38* (2013.01); *G06T 7/521* (2017.01); *G09G 3/002* (2013.01); *G09G 5/373* (2013.01); *G09G 2354/00* (2013.01)

(58) Field of Classification Search
CPC ... G06F 3/04817; G06F 3/0484; G03B 17/54; G03B 21/145; G09G 5/38; H04N 9/31
See application file for complete search history.

(56) References Cited

FOREIGN PATENT DOCUMENTS

| | | |
|---|---|---|
| JP | 2012-003533 A | 1/2012 |
| JP | 2015-127976 A | 7/2015 |
| WO | 2006/077665 A1 | 7/2006 |

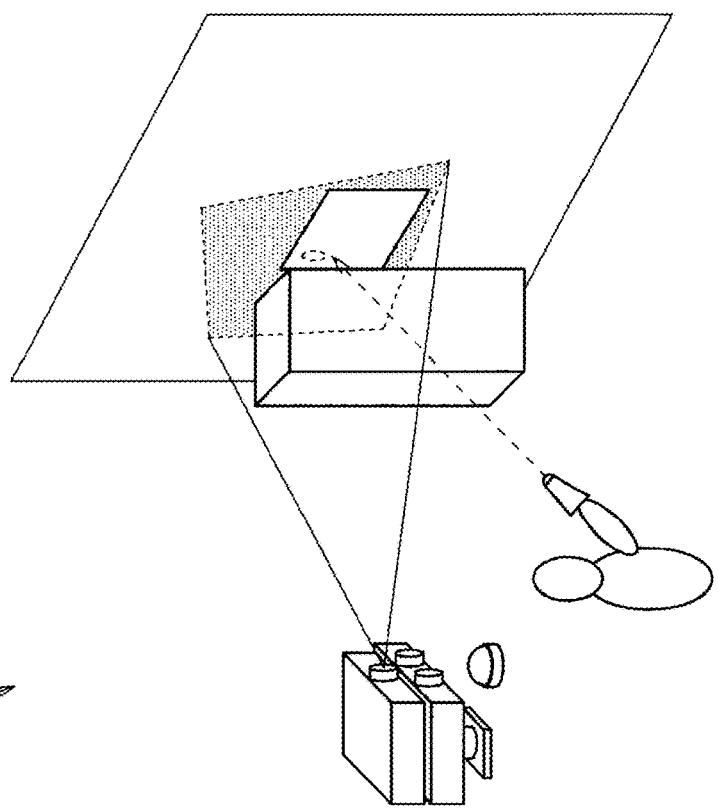
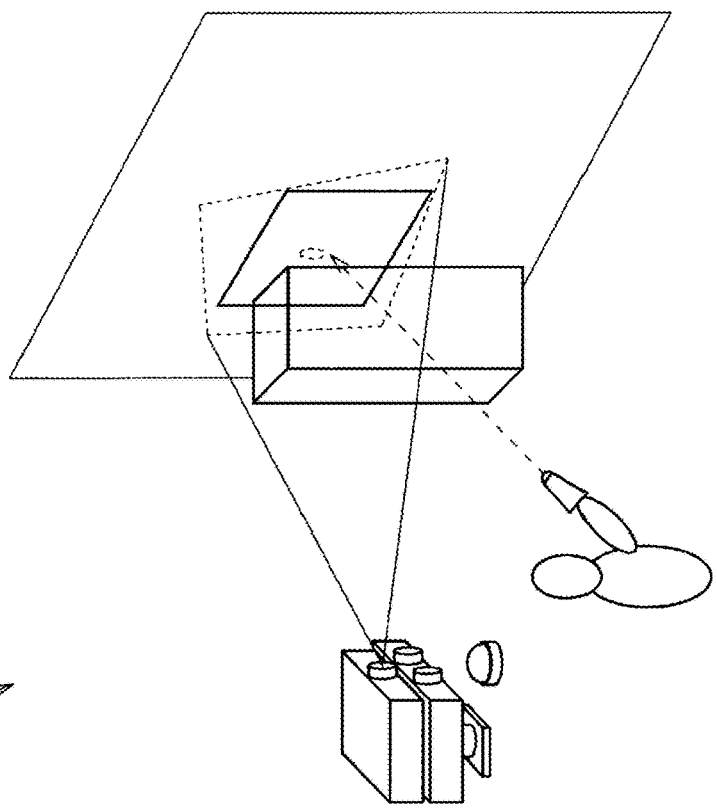
FIG. 7A
FIG. 7B
: PROJECTOR PROJECTABLE REGION
: DISPLAY IMAGE AFTER GEOMETRIC TRANSFORM
: PLANAR REGION EXCEPT FOR CONCAVITY AND CONVEXITY

FIG. 11

| PROJECTOR DESIGNATION METHOD | POINTED POSITION | METHOD |
|---|---|---|
| AUTOMATICALLY DETERMINE PROJECTOR TO BE OPERATED | WITHIN DISPLAY REGION (CONTENT OPERATION) | • SET PROJECTOR ORIGINATED FIRST AS OPERATION TARGET<br>• IN CASE OF REGION WHERE DISPLAY REGIONS OVERLAP, DETERMINE FROM FRONT-BEHIND RELATIONSHIP OF WINDOWS (EACH DRIVEN PROJECTOR HOLDS FRONT-BEHIND RELATIONSHIP INFORMATION OF EACH OTHER'S WINDOWS) |
| | OUTSIDE DISPLAY REGION (CHANGE OF DISPLAY POSITION) | SET PRIORITY TO DETERMINE PROJECTOR TO BE DRIVEN<br>EXAMPLES ARE AS FOLLOWS<br>• DISTANCE FROM PROJECTOR POSITION IS CLOSE<br>• DISTANCE FROM PROJECTION POSITION IS CLOSE<br>• SIZE OF PROJECTION REGION UPON PROJECTION IS LARGE<br>• DEFINITION UPON PROJECTION IS HIGH<br>• SET PROJECTOR OPERATED MOST RECENTLY AS TARGET<br><br>HOLD COVERAGE RANGE WHERE PROJECTION IS TO BE PERFORMED SO THAT RESPECTIVE PROJECTORS DO NOT OVERLAP<br>– ALLOCATE PROJECTION RANGE IN ADVANCE FROM ENVIRONMENT MAP |
| DESIGNATE PROJECTOR TO BE OPERATED BY USER | WITHIN DISPLAY REGION/OUTSIDE DISPLAY REGION | DISTINGUISH TARGET BY PROVIDING UNIQUE INFORMATION TO EACH PROJECTOR<br>EXAMPLES ARE AS FOLLOWS<br>• DIVIDE BY WAVELENGTH OF POINTER<br>• TRANSMIT ID INFORMATION TO PROJECTOR TO BE OPERATED UPON POINTING<br>• PROVIDE UNIQUE NAME AND DESIGNATE OPERATION TARGET THROUGH SPEECH RECOGNITION |

PROJECTOR A

PROJECTOR B

| PROJECTOR | FRONT-BEHIND RELATIONSHIP |
|---|---|
| PROJECTOR A | 1 |
| PROJECTOR B | 0 |
| ⋮ | ⋮ |

|  |  | UPON OPERATION WITHIN SCREEN (EXECUTION MODE) | UPON CHANGE OF DISPLAY POSITION (DISPLAY CONTROL MODE) |
|---|---|---|---|
| FIG. 13A | COLOR OF REGION BOUNDARY | CONTENT LIST [AAA][BBB][CCC] ☐: DISPLAY REGION | CONTENT LIST [AAA][BBB][CCC] |
| FIG. 13B | ADDING GRADATION | CONTENT LIST [AAA][BBB][CCC] ☐: DISPLAY REGION | CONTENT LIST [AAA][BBB][CCC] |
| FIG. 13C | CHANGE OF COLOR AND RATE OF PERMEABILITY OF WHOLE DISPLAY REGION | CONTENT LIST [AAA][BBB][CCC] ☐: DISPLAY REGION | CONTENT LIST [AAA][BBB][CCC] |
| FIG. 13D | CHANGE SHAPE OF SCREEN DURING MOVEMENT | CONTENT LIST [AAA][BBB][CCC] ☐: DISPLAY REGION | ONTENT L [A][BBB][C] |
| FIG. 13E | CHANGE SHAPE OF CURSOR | CONTENT LIST [AAA][BBB][CCC] ○ CURSOR POSITION ☐: DISPLAY REGION | CONTENT LIST [AAA][BBB][CCC] ⬭ → DISPLAY POSITION CHANGE DIRECTION CURSOR POSITION |

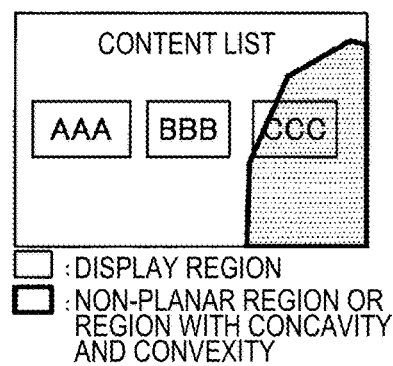
FIG. 14A UPON NORMAL DISPLAY
☐ : DISPLAY REGION
☐ : NON-PLANAR REGION OR REGION WITH CONCAVITY AND CONVEXITY
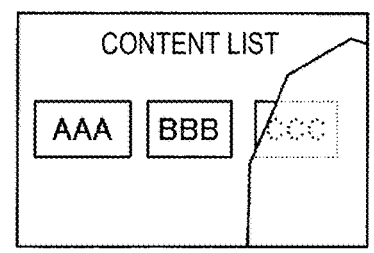
FIG. 14B UPON FEEDBACK
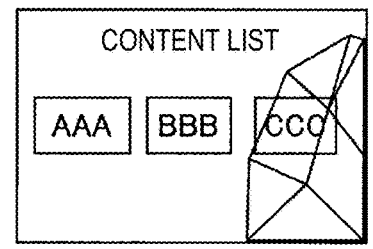
FIG. 14C
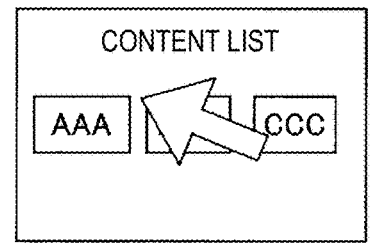
FIG. 14D UPON NORMAL DISPLAY | FIG. 15B  UPON FEEDBACK
FIG. 15A
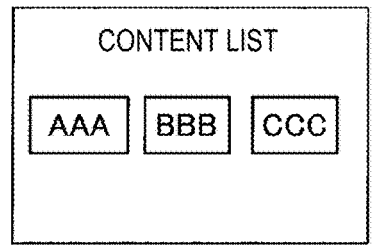
□ : DISPLAY REGION
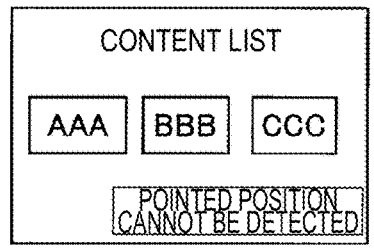
FIG. 15C
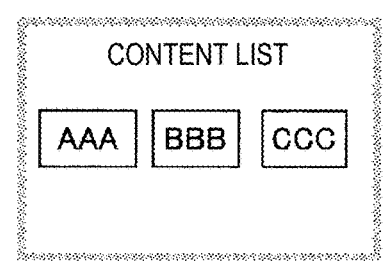
□ : FLICKERED

INFORMATION PROCESSING APPARATUS AND INFORMATION PROCESSING METHOD FOR DISPLAY CONTROL

CROSS REFERENCE TO RELATED APPLICATIONS

This application is a U.S. National Phase of International Patent Application No. PCT/JP2016/067798 filed on Jun. 15, 2016, which claims priority benefit of Japanese Patent Application No. JP 2015-176795 filed in the Japan Patent Office on Sep. 8, 2015. Each of the above-referenced applications is hereby incorporated herein by reference in its entirety.

TECHNICAL FIELD

The present disclosure relates to an information processing apparatus, an information processing method, and a program.

BACKGROUND ART

A technology relating to a projection device which can change a projection direction has been developed. As a technology of adjusting positional relationship between a projection device and a rotation mechanism so that a position of the center of projection of an image matches a position of the center of rotation of the rotation mechanism, for example, there is a technology disclosed in the following Patent Literature 1.

CITATION LIST

Patent Literature

Patent Literature 1: WO 2006/077665

DISCLOSURE OF INVENTION

Technical Problem

For example, a case will be assumed where display regions which can include various display objects (such as, for example, a display object associated with a user interface (UI) and a display object associated with content such as an image (a moving image or a still image)) are displayed at various positions within space such as a wall and a ceiling. In the above-described case, there is a possible case where "a user performs two types of operation which are operation of designating a position where a display region is to be displayed and operation with respect to a display object within the display region".

Here, for example, the user can perform the two types of operation which are the operation of designating a position where a display region is to be displayed and the operation with respect to a display object within the display region by respectively utilizing two different operation systems which are an operation system for performing the operation of designating a position where a display region is to be displayed and an operation system for performing the operation with respect to a display object within the display region. However, in the case where the user utilizes the two different operation systems as described above, there is a possibility that, due to utilization of different operation systems, operation of the user may become complicated, and operability of the user may degrade.

The present disclosure proposes new and improved information processing apparatus, information processing method and program which can realize improvement of operability of the user.

Solution to Problem

According to the present disclosure, there is provided an information processing apparatus including: a processing unit configured to switch, on a basis of a determination result as to whether or not a determination region determined on a basis of a display region which becomes a target of operation of one operation system includes a pointed position pointed in response to the operation, between a display control mode for changing a position or a shape of the display region on a basis of the operation and an execution mode for executing processing corresponding to a display object within the display region on a basis of the operation, in which the display region indicates a unit when the position or the shape of the display region is changed in the display control mode.

Further, according to the present disclosure, there is provided an information processing method executed by an information processing apparatus, the method including: a step of performing processing on a basis of a determination result as to whether or not a determination region determined on a basis of a display region which becomes a target of operation of one operation system includes a pointed position pointed in response to the operation, the processing being processing of switching between a display control mode for changing a position or shape of the display region on a basis of the operation and an execution mode for executing processing corresponding to a display object within the display region on a basis of the operation, in which the display region indicates a unit when the position or the shape of the display region is changed in the display control mode.

Further, according to the present disclosure, there is provided a program causing a computer to implement a function of performing processing on a basis of a determination result as to whether or not a determination region determined on a basis of a display region which becomes a target of operation of one operation system includes a pointed position pointed in response to the operation, the processing being processing of switching between a display control mode for changing a position or shape of the display region on a basis of the operation and an execution mode for executing processing corresponding to a display object within the display region on a basis of the operation, in which the display region indicates a unit when the position or the shape of the display region is changed in the display control mode.

Advantageous Effects of Invention

According to the present disclosure, it is possible to realize improvement of operability of a user.

Note that the effects described above are not necessarily limitative. With or in the place of the above effects, there may be achieved any one of the effects described in this specification or other effects that may be grasped from this specification.

BRIEF DESCRIPTION OF DRAWINGS

FIGS. 7A and 7B are explanatory diagrams for explaining an example of the information processing method according to the present embodiment.

FIG. 11 is an explanatory diagram for explaining an example of the information processing method according to the present embodiment.

FIGS. 13A, 13B, 13C, 13D, and 13E are explanatory diagrams for explaining an example of the information processing method according to the present embodiment.

FIGS. 14A, 14B, 14C, and 14D are explanatory diagrams for explaining an example of the information processing method according to the present embodiment.

FIGS. 15A, 15B, and 15C are explanatory diagrams for explaining an example of the information processing method according to the present embodiment.

MODE(S) FOR CARRYING OUT THE INVENTION

Figure 1:
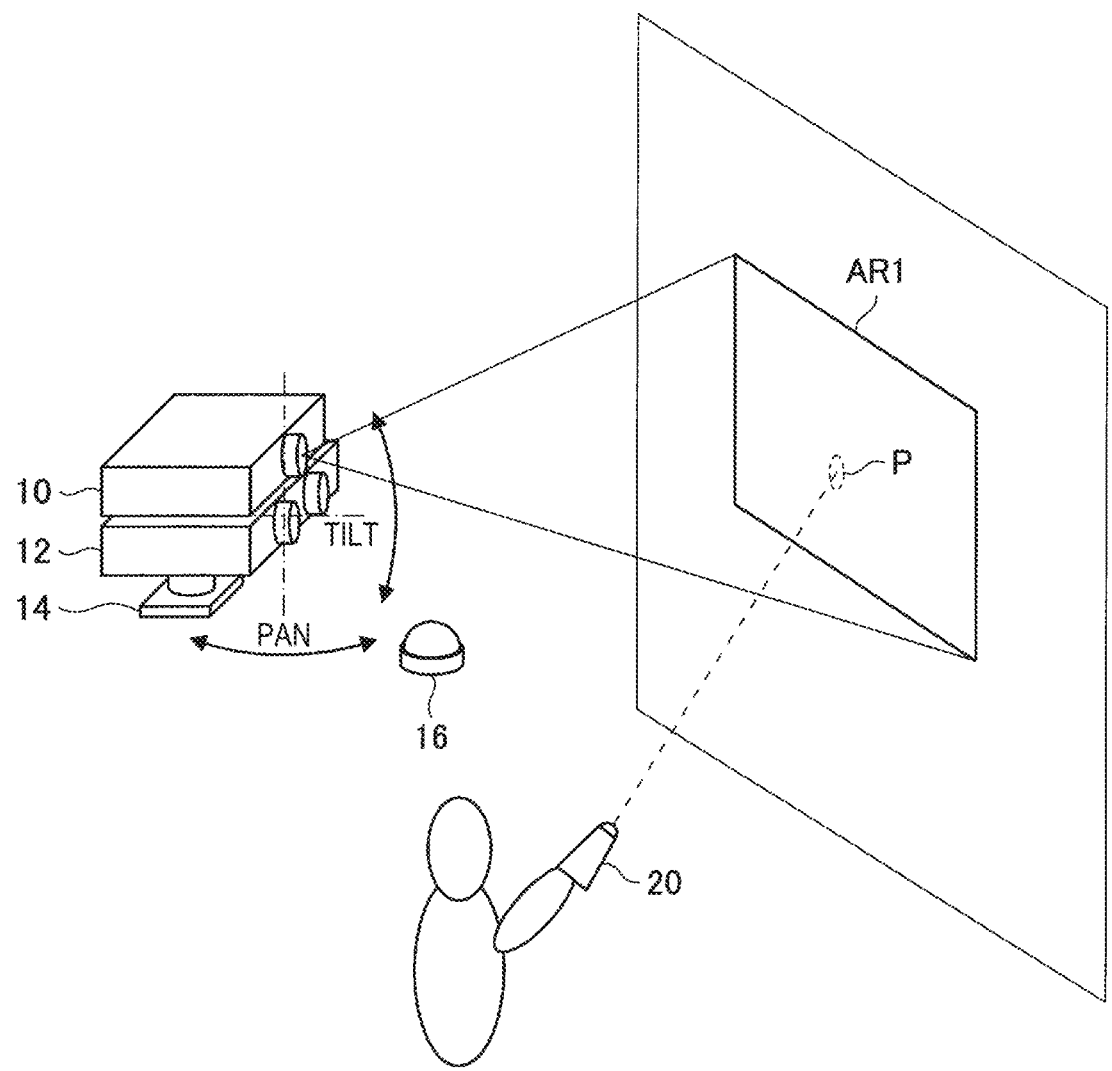
FIG. 1 is an explanatory diagram for explaining an example of an information processing method according to the present embodiment.

Hereinafter, a preferred embodiment of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in the following description, description will be provided in the following order.
1. Information processing method according to the present embodiment
2. Information processing apparatus according to the present embodiment
3. Program according to the present embodiment (Information Processing Method According to the Present Embodiment)

First, an information processing method according to the present embodiment will be described. In the following description, the information processing method according to the present embodiment will be described using an example where processing associated with the information processing method according to the present embodiment is performed by an information processing apparatus according to the present embodiment.

[1] Example of System Associated with Operation Environment According to the Present Embodiment Before the information processing method according to the present embodiment is described, an example of a system associated with an operation environment according to the present embodiment will be described.

FIG. 1 is an explanatory diagram for explaining an example of the information processing method according to the present embodiment and illustrates an example of the system associated with the operation environment according to the present embodiment. FIG. 1 illustrates an example where two types of operation which are operation of designating a position where a display region AR1 projected on a wall, or the like, is to be displayed and operation with respect to a display object within the display region AR1 are performed by a user performing pointing operation using a pointing device.

The system illustrated in FIG. 1 includes a projection device 10, an infrared camera 12, an actuation device 14, an infrared fisheye camera 16 and a pointing device 18. Further, while not illustrated in FIG. 1, the system illustrated in FIG. 1 includes the information processing apparatus according to the present embodiment.

Examples of the projection device 10 can include, for example, a projector. In the following description, there is a case where the projection device will be referred to as a "projector".

The infrared camera 12, which is an imaging device which observes infrared light, observes infrared light in a projection direction of the projection device 10, that is, a direction in which the display region AR1 is displayed in space.

Further, the infrared camera 12 has, for example, two infrared cameras and functions as a depth sensor. Depth information obtained from a captured image acquired from the infrared camera 12 (an example of information indicating an observation result of the infrared camera 12) is used for, for example, correction (such as, for example, geometric correction) of an image projected from the projection device 10.

The actuation device 14 has a rotation mechanism and changes a projection direction of the projection device 10 and an observation direction of the infrared camera 12. The actuation device 14 changes, for example, one or more of a pan direction, a tilt direction and a roll direction using the rotation mechanism. Further, the actuation device 14 may further have a moving mechanism such as a motor and a wheel.

In the system illustrated in FIG. 1, the display region AR1 can be displayed at an arbitrary position within space by the projection direction of the projection device 10 being changed in an arbitrary direction by the actuation device 14.

The infrared fisheye camera 16 is a fisheye camera which observes infrared light.

The pointing device 18 is an example of an operation device used by the user for operation. The pointing device 18 may be a device dedicated to pointing or may be a general-purpose device which can be utilized in other application such as a smartphone and a remote controller.

The pointing device 18, for example, emits infrared light and indicates a position in accordance with operation of the user with the infrared light. Further, the pointing device 18 may further have an operation device such as a plurality of buttons and a touch panel.

In the following description, an example will be described where the pointing device 18 has two buttons of a button A and a button B. Further, in the following description, it is assumed that pointing is performed by the user depressing the button A, and thereby infrared light being emitted from the pointing device 18. Further, it is assumed that, by the user depressing the button B, a display object within a display region existing at the pointed position is selected, or processing corresponding to the display object is executed.

The information processing apparatus according to the present embodiment performs processing associated with the information processing method according to the present embodiment using, for example, information indicating the observation result of the infrared camera 12 and information indicating the observation result of the infrared fisheye camera 16. Further, the information processing apparatus according to the present embodiment can also perform processing associated with the information processing method according to the present embodiment on the basis of, for example, an operation signal in accordance with operation of buttons of the pointing device 18.

The system associated with the operation environment according to the present embodiment has a configuration as illustrated in, for example, FIG. 1.

In the system illustrated in FIG. 1, for example, the display region AR1 is displayed at an arbitrary position within space by the projection direction of the projection device 10 being changed to an arbitrary position by the actuation device 14. Further, in the system illustrated in FIG. 1, for example, a pointed position P pointed in response to user operation using the pointing device 18 can be obtained by infrared light emitted from the pointing device 18 being observed by the infrared camera 12 which observes infrared light in a direction in which the display region AR1 is displayed and the infrared fisheye camera 16.

Note that the system associated with the operation environment according to the present embodiment is not limited to the configuration illustrated in FIG. 1.

For example, the infrared fisheye camera 16 illustrated in FIG. 1 can be replaced with a device which can observe infrared light in a wide angle.

Further, in the system illustrated in FIG. 1, while an example of a configuration in the case where the pointed position P is obtained by infrared light emitted from the pointing device 18 being observed has been described, the configuration of the system associated with the operation environment according to the present embodiment is not limited to the above-described example.

For example, the system associated with the operation environment according to the present embodiment may employ a configuration where a position designated with the finger of the user or a position on which a gaze of the user is focused is obtained as the pointed position P.

It is possible to obtain the position designated with the finger of the user as the pointed position P by utilizing an arbitrary gesture detection technology such as a gesture detection technology utilizing a captured image. Further, for example, it is possible to obtain the position designated with the finger of the user as the pointed position P by utilizing an arbitrary gaze detection technology which utilizes a "corneal reflection method" such as a "pupil conical reflection method", a "limbus reflection method", an "active appearance model (AAM) which tracks feature points obtained from the eyes, the nose, the mouth, or the like, after detecting the face", or the like.

Further, the system associated with the operation environment according to the present embodiment may employ a configuration where the pointed position P is obtained through observation of, for example, a light emitting diode (LED) or laser which is visible light. In a case of the configuration where the pointed position P is obtained through observation of an LED or laser which is visible light, in the system associated with the operation environment according to the present embodiment, an imaging device which can observe visible light is provided in place of the infrared camera 12 and the infrared fisheye camera 16.

Further, in the system illustrated in FIG. 1, while an example has been described where the display region is displayed through projection by the projection device 10, the system associated with the operation environment according to the present embodiment may employ a configuration where the display region is displayed on a display screen of a display device disposed within space such as a wall and a ceiling. In a case of the configuration where the display region is displayed on the display screen of the display device disposed within space, in the system associated with the operation environment according to the present embodiment, it is not necessary to provide the actuation device 14 and the depth sensor illustrated in FIG. 1.

Further, the system associated with the operation environment according to the present embodiment may employ a configuration where projection can be performed in all directions within space using a plurality of projection devices. In a case of the configuration where projection can be performed in all directions within space using a plurality of projection devices, in the system associated with the operation environment according to the present embodiment, it is not necessary to provide the actuation device 14 illustrated in FIG. 1.

Further, while, in the system illustrated in FIG. 1, an example has been described where the infrared camera 12 plays a role of a depth sensor, the system associated with the operation environment according to the present embodiment can obtain depth information by a device being provided which is associated with an arbitrary scheme with which depth can be obtained, such as a scheme using a stereo depth camera, a time of flight (TOF) scheme, and a scheme in which an infrared laser pattern is projected.

Further, while, in the system illustrated in FIG. 1, the example has been described where pointing using infrared light emitted from the pointing device 18 is detected by utilizing the infrared fisheye camera 16, in the system associated with the operation environment according to the present embodiment, it is no necessary to provide the infrared fisheye camera 16. In a case of the configuration where the infrared fisheye camera 16 is not provided, in the system associated with the operation environment according to the present embodiment, the pointed position in space is estimated with, for example, a sensor which can detect attitude and motion of the pointing device 18 such as an acceleration sensor and a gyro sensor provided at the pointing device 18.

Figure 2:
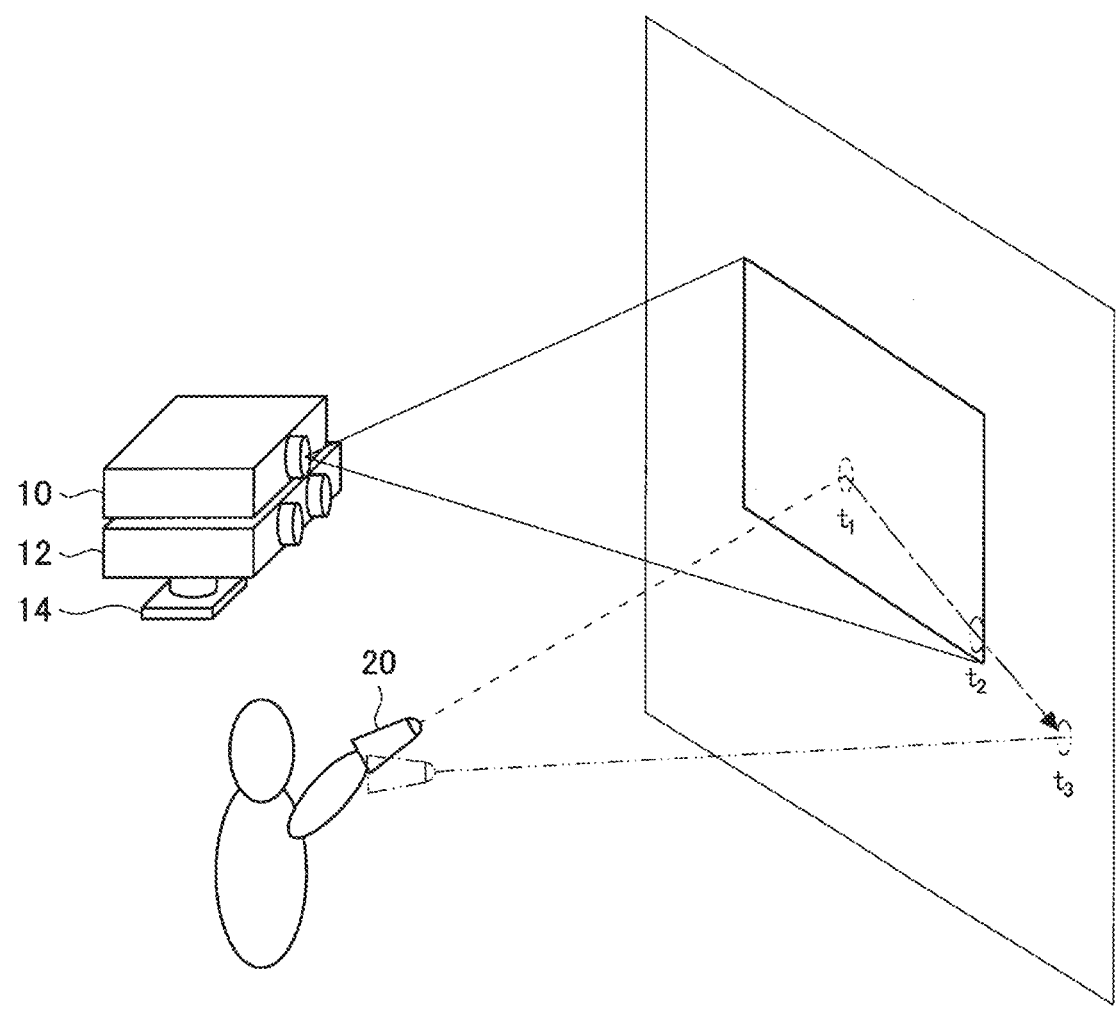
FIG. 2 is an explanatory diagram for explaining an example of the information processing method according to the present embodiment.

FIG. 2 is an explanatory diagram for explaining an example of the information processing method according to the present embodiment and illustrates an example where the pointed position in space is estimated with a sensor provided at the pointing device 18.

In the case where the pointed position in space is estimated with the sensor provided at the pointing device 18, the information processing apparatus according to the present embodiment, for example, holds an emission direction of infrared light at the pointing device 18 as a reference direction when the pointed position is detected within a determination region (which will be described later) on the basis of a captured image acquired from the infrared camera 12 (an example of information indicating the observation result of the infrared camera 12).

In the case where the pointed position from the captured image acquired from the infrared camera 12 is no longer detected, the pointed position in space is estimated from relative change of infrared light at the pointing device 18 from the reference direction to an emission direction. For example, in the case where the emission direction of infrared light at time t2 illustrated in FIG. 2 is held in the reference direction, the pointed position at time t3 is estimated from relative change from the reference direction to an emission direction of the infrared light at time t3 illustrated in FIG. 2.

Further, the system associated with the operation environment according to the present embodiment can employ a "configuration where the infrared camera 12 is not provided, and pointing by the infrared light emitted from the pointing device 18 is detected by utilizing the infrared fisheye camera 16".

Further, the system associated with the operation environment according to the present embodiment may employ a "configuration where light of two types of wavelengths is emitted from the pointing device 18 and operation for changing a position, or the like, where the display region is to be displayed and operation for executing processing corresponding to a display object within the display region are distinguished in accordance with a wavelength of the light". For example, in the case where infrared light of a wavelength a and infrared light of a wavelength b (a≠b) are emitted from the pointing device 18, in the system associated with the operation environment according to the present embodiment, by employing a configuration where the infrared camera 12 observes the infrared light of the wavelength a, and the infrared fisheye camera 16 observes the infrared light of the wavelength b, it is possible to distinguish operation in accordance with a wavelength of the light. Note that it is possible to distinguish operation in accordance with a wavelength of light in a similar manner even if infrared light is replaced with light having other wavelengths such as visible light.

Further, while, in the system illustrated in FIG. 1, an example has been described where one user performs operation using the pointing device 18, in the system associated with the operation environment according to the present embodiment, each of a plurality of users can perform operation using the pointing device 18.

In the case where the system associated with the operation environment according to the present embodiment is utilized by a plurality of users, the information processing apparatus according to the present embodiment performs processing associated with the information processing method according to the present embodiment which will be described later on the basis of operation using the pointing device 18 performed by each user.

Note that, in the case where the system associated with the operation environment according to the present embodiment is utilized by a plurality of users, the information processing apparatus according to the present embodiment can also perform processing on the basis of an authentication result of each of the users authenticated using an arbitrary authentication technology, within a scope of authority corresponding to the authenticated users. The processing associated with authentication may be performed by the information processing apparatus according to the present embodiment or may be performed by an external apparatus of the information processing apparatus according to the present embodiment.

The processing associated with the information processing method according to the present embodiment will be described below using an example of the system illustrated in FIG. 1.

[2] Processing Associated with Information Processing Method According to the Present Embodiment As described above, the user can perform two types of operation which are operation of designating a position where a display region is to be displayed and operation with respect to a display object within a display region by respectively utilizing two different operation systems which are an operation system for performing operation of designating a position where a display region is to be displayed and an operation system for performing operation with respect to a display object within a display region. However, in the case where the user utilizes the two different operation systems as described above, there is a possibility that, due to utilization of different operation systems, operation of the user may become complicated, and operability of the user may degrade.

Therefore, the information processing apparatus according to the present embodiment performs processing of switching between a display control mode and an execution mode (in the present embodiment, switching processing of switching between the display control mode and the execution mode will be also referred to as "selection processing") on the basis of, for example, a determination result as to whether or not, in a determination region determined on the basis of a display region which becomes a target of operation of one operation system, a pointed position by the operation is included. By the selection processing being performed, the information processing apparatus according to the present embodiment can, for example, enable control of display of a display region based on the operation and execution of processing corresponding to a display object within a display region based on the operation, on the basis of operation of one operation system.

Here, the display control mode according to the present embodiment is a processing mode for controlling display of a display region on the basis of operation of one operation system. In the case where processing is performed in the display control mode according to the present embodiment, for example, change of a display position of a display region can be realized on the basis of operation of one operation system. Further, in the case where processing is performed in the display control mode according to the present embodiment, for example, change of a size of a display region, rotation, and change of a shape such as change of an aspect ratio may be performed. Here, the display region may be a displayable region (a projectable region in the case where the display apparatus is a projector) which is a limit region where the display apparatus can display video at a time, or may be a region which is set within the displayable region, which is set as a range (unit) affected when movement, change in shape, or the like, is performed in accordance with operation by the user, and whose boundary is visually indicated, or may be one unit (so-called a window) in a graphical interface to be used by a predetermined task or application program application to handle data.

Further, the execution mode according to the present embodiment is a processing mode for executing processing corresponding to a display object within a display region on the basis of operation of one operation system. In the case where processing is performed in the execution mode according to the present embodiment, for example, various kinds of processing associated with a display region, such as processing associated with a UI within a display region, processing associated with reproduction of an image and processing associated with execution of application are realized in response to operation of one operation system. Note that there may be other modes other than the display control mode and the execution mode.

Processing in accordance with the display control mode selected through the selection processing or processing in accordance with the execution mode selected through the selection processing may be, for example, performed by the information processing apparatus according to the present embodiment or may be performed at an external apparatus of the information processing apparatus according to the present embodiment. In the following description, there is a case where the processing in accordance with the display control mode selected through the selection processing or the processing in accordance with the execution mode selected through the selection processing are collectively referred to as "processing in accordance with the selected mode". Further, in the following description, a case will be mainly described as an example where the processing in accordance with the selected mode is performed by the information processing apparatus according to the present embodiment.

Further, the determination region according to the present embodiment is a region corresponding to the display region, which becomes a basis of determination for selecting the display control mode or the execution mode.

Examples of the determination region according to the present embodiment can include, for example, a region which is identical to the display region.

Further, the determination region according to the present embodiment may be a region which is larger than the display region and which includes the display region.

Figure 3:
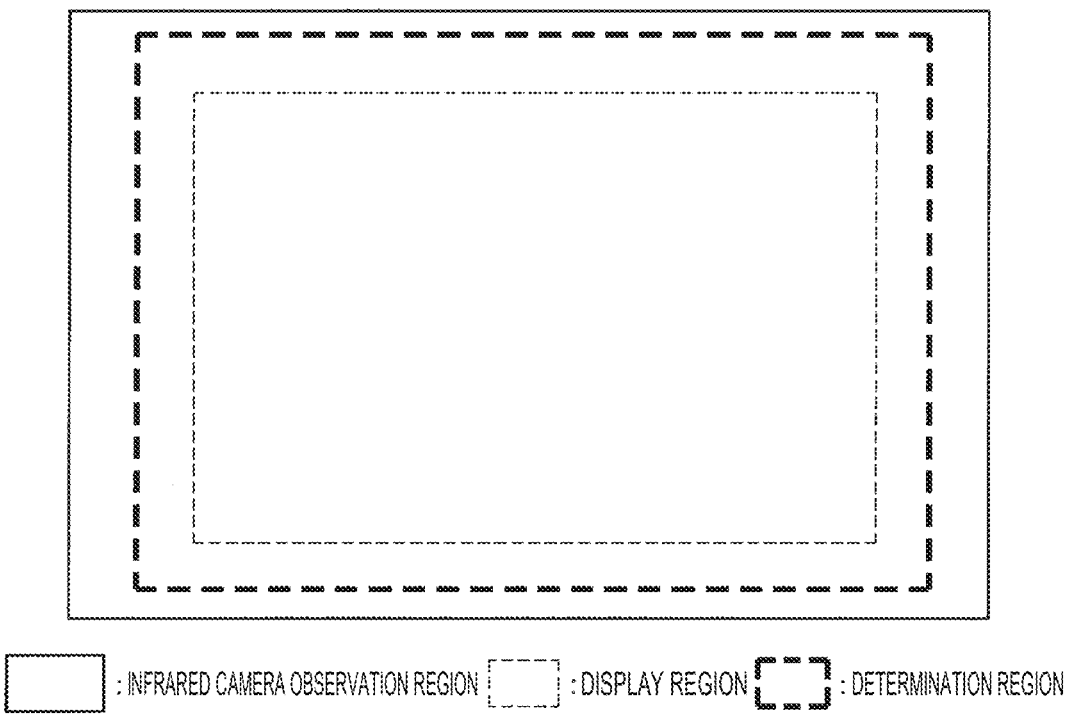
FIG. 3 is an explanatory diagram for explaining an example of the information processing method according to the present embodiment.

FIG. 3 is an explanatory diagram for explaining an example of the information processing method according to the present embodiment and illustrates an example of the determination region according to the present embodiment.

For example, as illustrated in FIG. 3, in the case where a region which includes the display region and which is larger than the display region is set as the determination region according to the present embodiment, even when the pointed position frequently changes around an end of the display region, it is possible to prevent setting of the display control mode and the execution mode from being frequently performed.

Specifically, the information processing apparatus according to the present embodiment selects the display control mode or the execution mode on the basis of positional relationship between the pointed position pointed in response to operation of one operation system and the determination region.

The information processing apparatus according to the present embodiment selects the execution mode in the case where the pointed position is included in the determination region. Further, the information processing apparatus according to the present embodiment selects the display control mode in the case where the pointed position is located outside the determination region.

Figure 4:
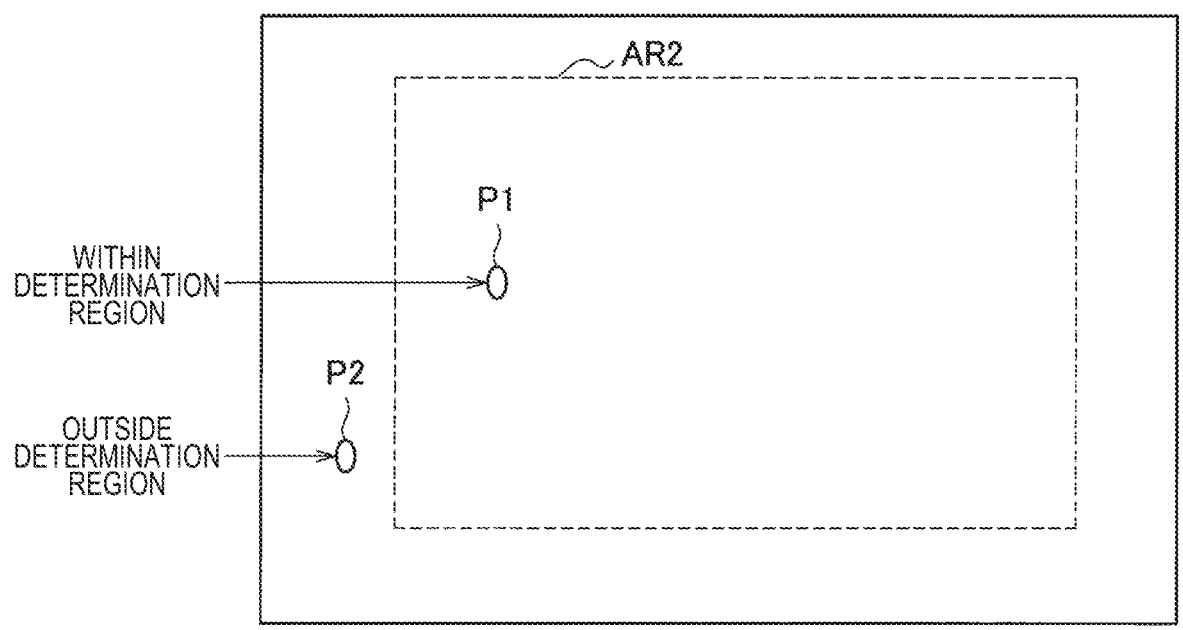
FIG. 4 is an explanatory diagram for explaining an example of the information processing method according to the present embodiment.
Figure 5:
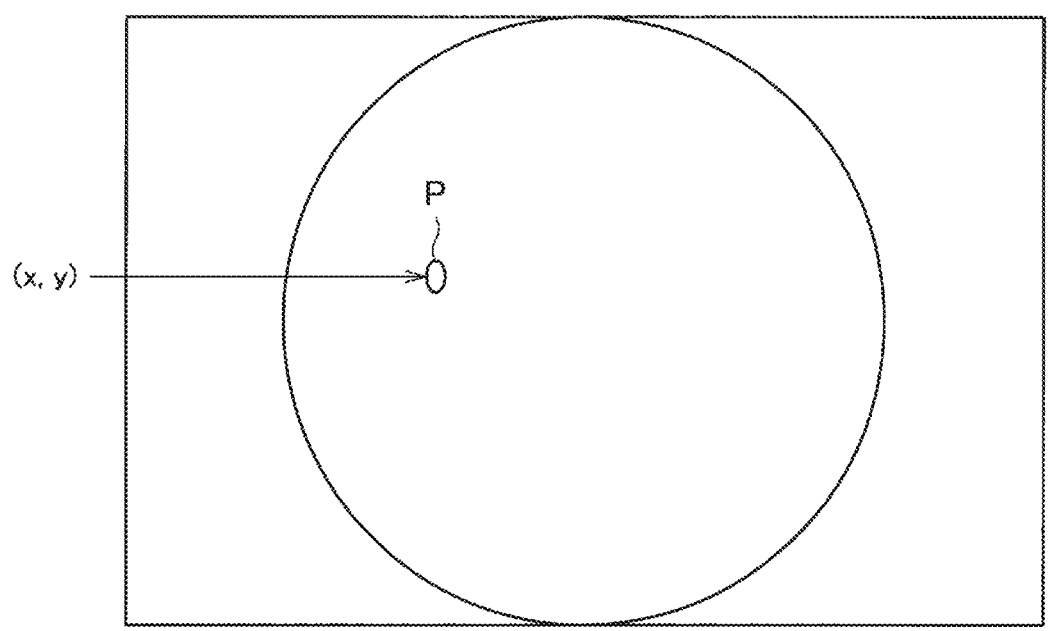
FIG. 5 is an explanatory diagram for explaining an example of the information processing method according to the present embodiment.

FIG. 4 and FIG. 5 are explanatory diagrams for explaining an example of the information processing method according to the present embodiment. FIG. 4 illustrates an example of a captured image acquired from the infrared camera 12, and FIG. 5 illustrates an example of a captured image acquired from the infrared fisheye camera 16. "AR2" illustrated in FIG. 4 indicates an example of the determination region.

The information processing apparatus according to the present embodiment specifies positional relationship between the pointed position and the determination region on the basis of, for example, a "captured image acquired from the infrared camera 12 (an example of information indicating the observation result of the infrared camera 12)" or a "captured image acquired from the infrared camera 12 and a captured image acquired from the infrared fisheye camera 16 (information indicating the observation result of the infrared fisheye camera 16)".

The information processing apparatus according to the present embodiment selects the execution mode, for example, on the basis of the captured image acquired from the infrared camera 12 in the case where it is detected that the pointed position is located within the determination region AR2 as indicated with P1 in FIG. 4.

Further, the information processing apparatus according to the present embodiment selects the display control mode, for example, on the basis of the captured image acquired from the infrared camera 12 in the case where it is detected that the pointed position is located outside the determination region AR2 as indicated with P2 in FIG. 4.

Here, in the case where the pointed position is located outside the determination region AR2, there is a possible case where the infrared light emitted from the pointing device 18 is not observed at the infrared camera 12, that is, the pointed position is not specified from the captured image acquired from the infrared camera 12. Even in the case where the pointed position is not specified from the captured image acquired from the infrared camera 12 as described above, the information processing apparatus according to the present embodiment can specify the pointed position within space on the basis of the captured image acquired from the infrared fisheye camera 16 as indicated with P in FIG. 5.

Therefore, the information processing apparatus according to the present embodiment can also select the display control mode in the case where, for example, the pointed position is not specified from the captured image acquired from the infrared camera 12 and the pointed position is specified from the captured image acquired from the infrared fisheye camera 16.

Note that the information processing apparatus according to the present embodiment may selectively perform selection processing on the basis of an operation signal acquired from the pointing device 18.

The information processing apparatus according to the present embodiment performs selection processing by being triggered by, for example, acquisition of an operation signal indicating that the button A is depressed (an example of the operation signal indicating that infrared light is emitted), from the pointing device 18. Further, the information processing apparatus according to the present embodiment does not perform selection processing by being triggered by, for example, acquisition of an operation signal indicating that the button A is not depressed (an example of the operation signal indicting that infrared light is not emitted), from the pointing device 18. Note that it goes without saying that an example of the processing in the case where the selection processing is selectively performed is not limited to the above-described examples.

By the information processing apparatus according to the present embodiment performing the above-described selection processing as the processing associated with the information processing method according to the present embodiment, the display control mode or the execution mode is selected on the basis of, for example, operation associated with pointing using the pointing device 18 (an example of operation of one operation system).

Therefore, the user can change the position where the display region is to be displayed, or the like, or can execute processing corresponding to a display object within the display region by, for example, performing pointing using the pointing device 18. Therefore, by the information processing apparatus according to the present embodiment performing the above-described selection processing as the processing associated with the information processing method according to the present embodiment, it is possible to realize improvement of operability of the user.

Figure 6:
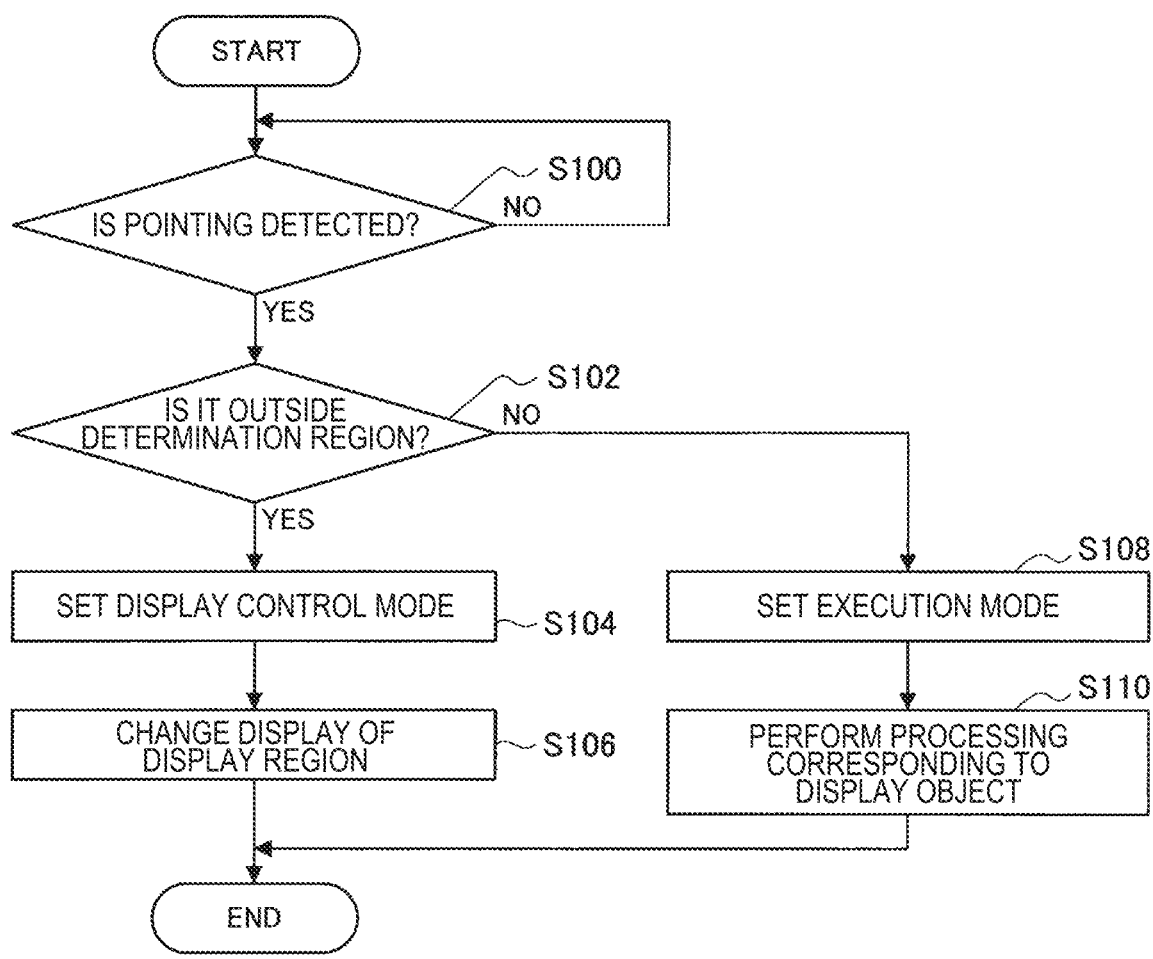
FIG. 6 is a flowchart illustrating an example of processing associated with the information processing method according to the present embodiment.

FIG. 6 is a flowchart illustrating an example of the processing associated with the information processing method according to the present embodiment. Step S100 to S104 and S108 illustrated in FIG. 6 correspond to an example of the selection processing. Further, processing in step S106 and S110 illustrated in FIG. 6 corresponds to an example of the processing in accordance with the selected mode.

The information processing apparatus according to the present embodiment determines whether or not pointing is detected (S100). The information processing apparatus according to the present embodiment determines that pointing is detected in the case where the pointed position is detected on the basis of, for example, the "captured image acquired from the infrared camera 12" or the "captured image acquired from the infrared camera 12 and the captured image acquired from the infrared fisheye camera 16". Further, the information processing apparatus according to the present embodiment can also determine whether or not pointing is detected on the basis of, for example, an operation signal acquired from the pointing device 18.

In the case where it is not determined in step S100 that pointing is detected, the information processing apparatus according to the present embodiment does not make processing proceed until it is determined that pointing is detected.

Further, in the case where it is determined in step S100 that pointing is detected, the information processing apparatus according to the present embodiment determines whether or not the pointed position is located outside the determination region (S102). For example, as described above, the information processing apparatus according to the present embodiment determines whether or not the pointed position is located outside the determination region on the basis of the "captured image acquired from the infrared camera 12" or the "captured image acquired from the infrared camera 12 and the captured image acquired from the infrared fisheye camera 16".

In the case where it is determined in step S102 that the pointed position is located outside the determination region, the information processing apparatus according to the present embodiment sets the display control mode (S104).

The information processing apparatus according to the present embodiment then changes display of the display region as processing in accordance with the display control mode set in step S104 (S106).

The information processing apparatus according to the present embodiment changes display of the display region by, for example, displaying the display region at a position corresponding to the pointed position.

The information processing apparatus according to the present embodiment drives the actuation device 14 by, for example, obtaining a driving direction of the actuation device 14 so that the pointed position is located at a predetermined position in the display region and transmitting a signal including a control command to the actuation device 14. The information processing apparatus according to the present embodiment transmits the signal including the control command to the actuation device 14, for example, via a communication unit (which will be described later) or a connected communication device.

Here, examples of the predetermined position in the display region can include, for example, an arbitrary set position such as a center position of the display region.

Further, the information processing apparatus according to the present embodiment causes the projection device 10 to project an image by, for example, correcting an image to be projected in space on the basis of depth information obtained from the captured image acquired from the infrared camera 12 and transmitting a signal including the corrected image and the control command to the projection device 10. The information processing apparatus according to the present embodiment transmits the signal including the control command to the projection device 10 via, for example, a communication unit (which will be described later) or a connected communication device.

By the information processing apparatus according to the present embodiment controlling the actuation device 14 and the projection device 10, for example, as described above, display of the display region is changed.

Note that an example of change of display of the display region is not limited to the above-described example.

For example, the information processing apparatus according to the present embodiment can display the display region at a position where the display region can be displayed in the case where the display region cannot be displayed at a position corresponding to the pointed position. Examples of the case where the display region cannot be displayed at a position corresponding to the pointed position can include, for example, a case where, if the display region is displayed at the position corresponding to the pointed position, the display region is displayed on a non-planar portion, and a case where, if the display region is displayed at the position corresponding to the pointed position, part of the display region includes concavity and convexity (a case where, if the display region is displayed at the position corresponding to the pointed position, the display region is located across a plurality of planes).

The information processing apparatus according to the present embodiment displays the display region at a position where the display region can be displayed by, for example, moving the display region or reducing the size of the display region, or by moving the display region and reducing the size of the display region.

FIGS. 7A and 7B are explanatory diagrams for explaining an example of the information processing method according to the present embodiment and illustrates an example where the display region is displayed at a position where the display region can be displayed.

For example, as illustrated in FIG. 7A, in the case where part of the display region includes concavity and convexity if the display region is displayed at the position corresponding to the pointed position, the information processing apparatus according to the present embodiment searches for a maximum rectangular region from a planar region except for the concavity and convexity. The information processing apparatus according to the present embodiment, for example, searches for the above-described rectangular region by utilizing depth information.

The information processing apparatus according to the present embodiment then displays the display region at the searched rectangular region, for example, as illustrated in FIG. 7B.

Referring to FIG. 6 again, an example of processing associated with the information processing method according to the present embodiment will be described. In the case where it is not determined in step S102 that the pointed position is located outside the determination region, the information processing apparatus according to the present embodiment sets the execution mode (S108).

The information processing apparatus according to the present embodiment then performs processing corresponding to the display object included in the display region as processing in accordance with the execution mode set in step S104 (S110).

Figure 8:
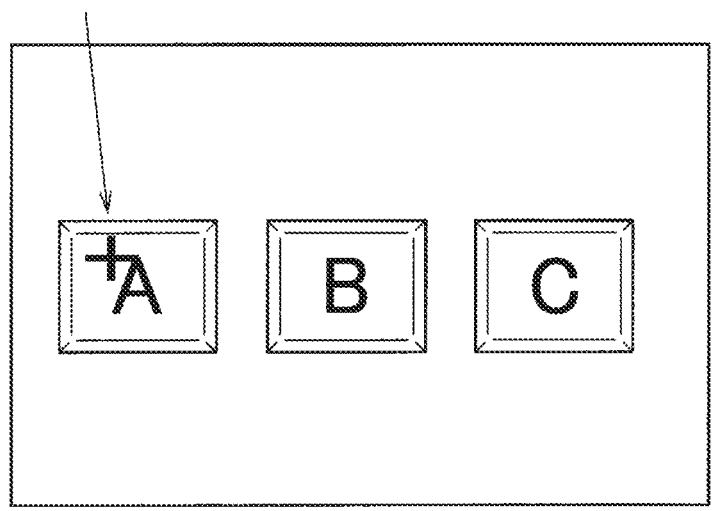
FIG. 8 is an explanatory diagram for explaining an example of the information processing method according to the present embodiment.

FIG. 8 is an explanatory diagram for explaining an example of the information processing method according to the present embodiment and illustrates an example of display of the display region in the case where the pointed position is located within the determination region. FIG. 8 illustrates an example where three icons (examples of the display objects) of an icon A, an icon B and an icon C are displayed in the display region.

In the case where the pointed position is located within the determination region, the information processing apparatus according to the present embodiment displays a cursor at the pointed position as illustrated in FIG. 8.

Further, the information processing apparatus according to the present embodiment, for example, performs processing associated with an icon corresponding to a position of the cursor (that is, the pointed position) on the basis of an operation signal acquired from the pointing device 18. For example, in the case where the user depresses the button B of the pointing device 18 when the cursor is located at the position illustrated in FIG. 8, the information processing apparatus according to the present embodiment performs processing associated with the icon A on the basis of an operation signal acquired from the pointing device 18. The information processing apparatus according to the present embodiment, for example, specifies processing associated with the icon A with reference to a table (or a database) in which icons are associated with data indicating processing such as execution of application and performs the specified processing.

Note that it goes without saying that an example of the processing in step S110 is not limited to the example described with reference to FIG. 8.

The information processing apparatus according to the present embodiment performs processing illustrated in, for example, FIG. 6 as the processing associated with the information processing method according to the present embodiment.

Here, by the processing illustrated in, for example, FIG. 6 being performed, the user can change the position where the display region is to be displayed, or the like, or can execute processing corresponding to the display object within the display region by, for example, performing pointing using the pointing device 18. Therefore, by the processing illustrated in, for example, FIG. 6 being performed as the processing associated with the information processing method according to the present embodiment, it is possible to realize improvement of operability of the user.

Note that it goes without saying that the processing associated with the information processing method according to the present embodiment is not limited to the processing illustrated in FIG. 6.

The information processing apparatus according to the present embodiment performs, for example, the "above-described selection processing" or the "above-described selection processing and the above-described processing in accordance with the selected mode" as the processing associated with the information processing method according to the present embodiment.

Note that the processing associated with the information processing method according to the present embodiment is not limited to the "above-described selection processing" or the "above-described selection processing and the above-described processing in accordance with the selected mode".

For example, the information processing apparatus according to the present embodiment can further perform one or more of the following processing (I) to (III) as the processing associated with the information processing method according to the present embodiment.

(I) Processing in the Case Where Content Corresponding to the Pointed Position Located Outside the Determination Region is Displayed in the Display Region When the pointed position changes from a position outside the determination to a position within the determination region in the case where selection processing has not been performed, the information processing apparatus according to the present embodiment displays content corresponding to the pointed position located outside the determination region in the display region.

Here, examples of the case where selection processing has not been performed can include, for example, a case where a trigger for performing selection processing is not detected, and a case where an operation signal corresponding to operation for displaying content corresponding to the pointed position located outside the determination region in the display region is detected.

Examples of the operation for displaying content corresponding to the pointed position located outside the determination region in the display region can include, for example, "operation of depressing the button of the pointing device 18 in a state where a position outside the determination region is pointed, and moving the pointed position to a position within the display region (or within the determination region) while the button is kept depressed". Further, examples of the operation for displaying content corresponding to the pointed position located outside the determination region in the display region may further include operation of releasing the button after the pointed position is moved to a position within the display region (or within the determination region). In the following description, there is a case where the "operation for displaying content corresponding to the pointed position located outside the determination region in the display region" which further includes the above-described operation of releasing the button is referred to as "drag and drop operation".

Figure 9:
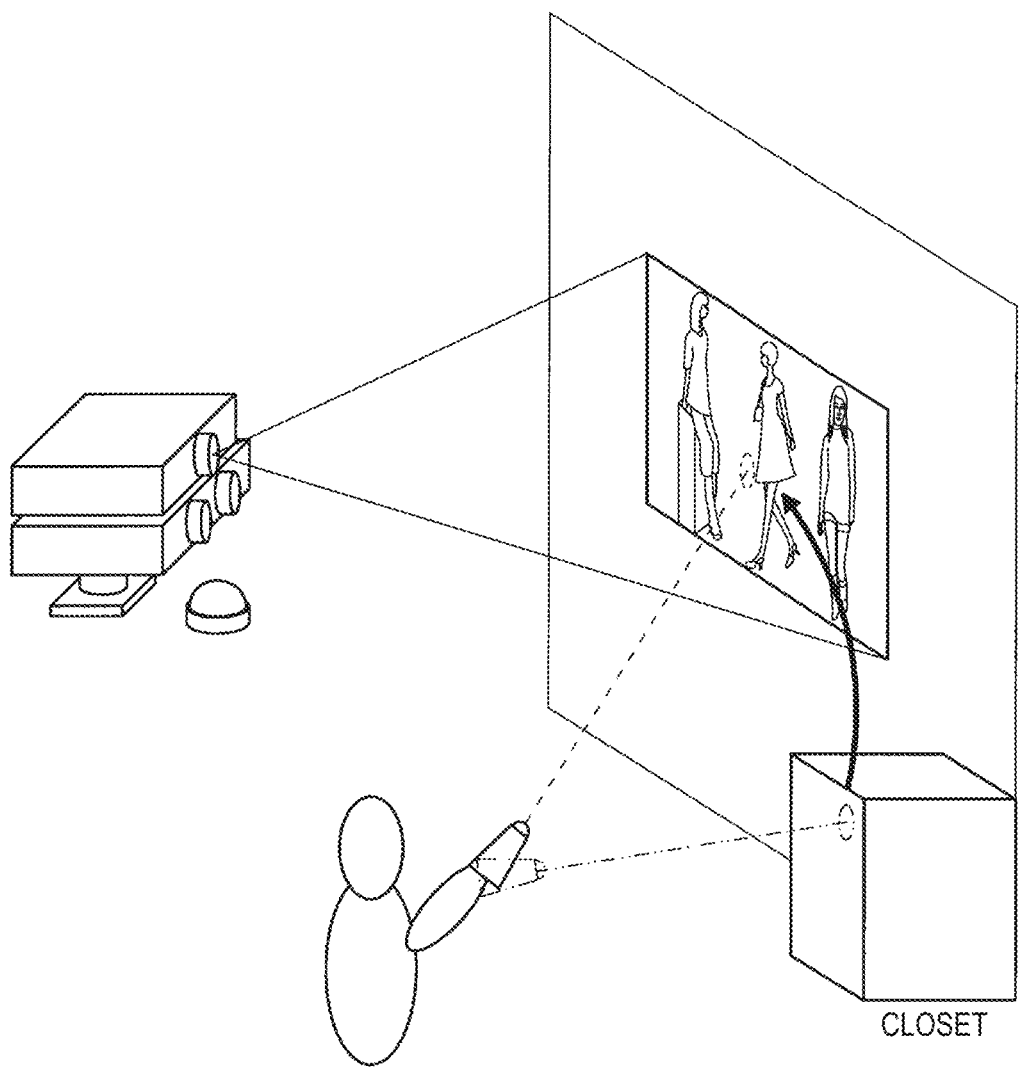
FIG. 9 is an explanatory diagram for explaining an example of the information processing method according to the present embodiment.

FIG. 9 is an explanatory diagram for explaining an example of the information processing method according to the present embodiment and illustrates an example of a case where content corresponding to the pointed position located outside the determination region is displayed in the display region.

For example, as illustrated in FIG. 9, if the user performs "operation of depressing the button of the pointing device 18 in a state where a closet within a room (an example of space) is pointed, and moving the pointed position to a position within the display region while the button is kept depressed", the information processing apparatus according to the present embodiment displays content relating to the closet in the display region. FIG. 9 illustrates an example where information relating to fashion is displayed in the display region as the content relating to the closet.

In another example, if the user perform "operation of depressing the button of the pointing device 18 in a state where a window within a room (an example of space) is pointed and moving the pointed position to a position within the display region while the button is kept depressed", the information processing apparatus according to the present embodiment displays content relating to the window in the display region. As the content relating to the window, for example, information relating to weather such as weather forecast is displayed in the display region.

The information processing apparatus according to the present embodiment, for example, specifies the pointed object by utilizing data indicating what kind of object is located at which position within space. The data indicating what kind of object is located at which position within space can be obtained from, for example, three-dimensional information obtained using a technology called simultaneous localization and mapping (SLAM), or the like, which creates a three-dimensional environment by utilizing a captured image obtained from an imaging device provided in space and a detection result of an object obtained using an arbitrary object detection technology such as an object detection technology utilizing a captured image. Note that the data indicating what kind of object is located at which position within space may be data generated by utilizing an arbitrary technology.

Figure 10:
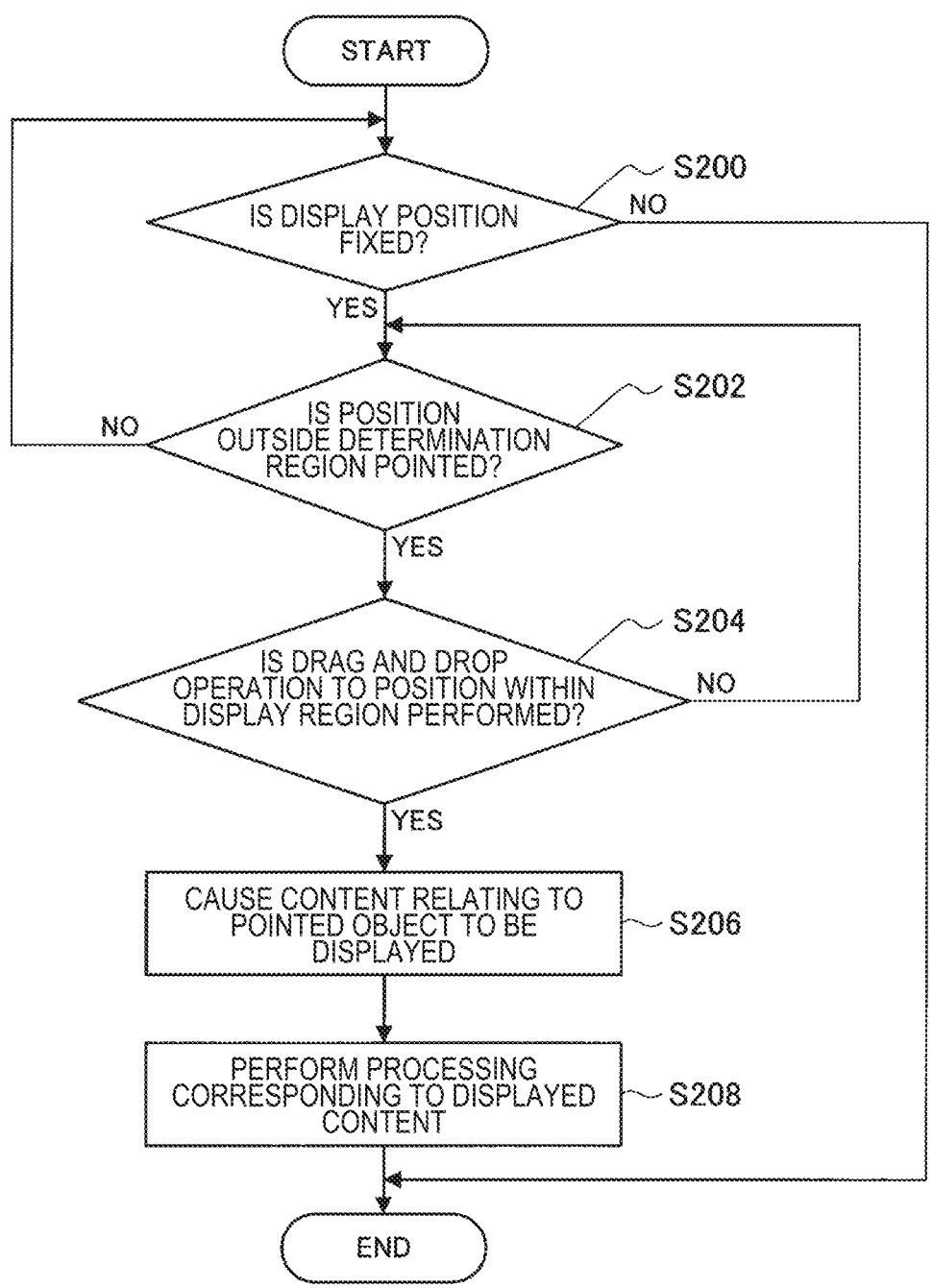
FIG. 10 is a flowchart illustrating an example of processing associated with the information processing method according to the present embodiment.

FIG. 10 is a flowchart illustrating an example of processing associated with the information processing method according to the present embodiment and illustrates an example of processing in the case where content corresponding to the pointed position located outside the determination region is displayed in the display region.

The information processing apparatus according to the present embodiment determines whether or not to fix the display position of the display region (S200). The information processing apparatus according to the present embodiment, for example, fixes the display position of the display region in the case where it is determined that selection processing has not been performed.

In the case where it is not determined in step S200 that the display position of the display region is fixed, the information processing apparatus according to the present embodiment finishes the processing illustrated in FIG. 10. In the case where it is not determined that the display position of the display region is fixed, for example, processing illustrated in FIG. 6 is performed.

Further, in the case where it is determined in step S200 that the display position of the display region is fixed, the information processing apparatus according to the present embodiment determines whether or not a position outside the determination region is pointed (S202). In the case where the pointed position is located outside the determination region, the information processing apparatus according to the present embodiment determines that a position outside the determination region is pointed.

In the case where it is not determined in step S202 that a position outside the determination region is pointed, the information processing apparatus according to the present embodiment, for example, repeats processing from step S200.

Further, in the case where it is determined in step S202 that a position outside the determination region is pointed, the information processing apparatus according to the present embodiment, for example, determines whether or not drag and drop operation to a position within the display region is performed (S204).

In the case where it is not determined in step S204 that drag and drop operation to a position within the display region is performed, the information processing apparatus according to the present embodiment, for example, repeats processing from step S202.

Further, in the case where it is determined in step S204 that drag and drop operation to a position within the display region is performed, the information processing apparatus according to the present embodiment, for example, causes content relating to the pointed object to be displayed in the display region (S206). Further, in the case where operation with respect to the display region is detected, the information processing apparatus according to the present embodiment performs processing corresponding to the content displayed in the display region (S208).

The information processing apparatus according to the present embodiment performs processing illustrated in, for example, FIG. 10 as processing of displaying content corresponding to the pointed position located outside the determination region in the display region. Note that it goes without saying that an example of the processing of displaying content corresponding to the pointed position located outside the determination region in the display region is not limited to the example illustrated in FIG. 10.

(II) Processing in the Case where there Exist a Plurality of Display Regions

For example, in the case where there exist a plurality of projectors (an example of an image projection device) within space, in the case where a plurality of display devices are provided in space, in the case where a plurality of display regions can be displayed on a display screen of a display device provided within space, or the like, a case is assumed where there exit a plurality of display regions within space.

In the case where there exist a plurality of display regions as described above, the information processing apparatus according to the present embodiment performs selection processing on a display region selected among the plurality of display regions. Further, in the case where there exist a plurality of display regions, the information processing apparatus according to the present embodiment can also perform the above-described processing (I) on a display region selected among the plurality of display regions.

Here, the information processing apparatus according to the present embodiment selects a display region, for example, on the basis of user operation. Examples of the user operation relating to selection of a display region can include operation of designating a projector, a display device or a display region. Designation of a projector, a display device or a display region is realized, for example, through the following method. Note that it goes without saying that an example for realizing designation of a projector, a display device or a display region is not limited to the examples described below.

A wavelength of light emitted from the pointing device 18 is set for each of a projector, a display device or a display region, and a projector, or the like, is designated in accordance with a wavelength of light emitted from the pointing device 18.

An ID is set for each of a projector, a display device or a display region, and a projector, or the like, is designated in accordance with an ID transmitted from the pointing device 18 or other apparatuses.

Unique name is set for each of a projector, a display device or a display region, and a projector, or the like, is designated in accordance with speech of the user recognized by utilizing an arbitrary speech recognition technology.

Further, the information processing apparatus according to the present embodiment may automatically select a display region without the above-described user operation relating to selection of a display region. Note that, even in the case where it is possible to automatically select a display region, in the case where the above-described user operation relating to selection of a display region is detected, the information processing apparatus according to the present embodiment can select a display region on the basis of the user operation.

The information processing apparatus according to the present embodiment, for example, selects a display region in which the pointed position is first included in the determination region among a plurality of display regions.

Further, in the case where a coverage region is allocated to each of the plurality of display regions, the information processing apparatus according to the present embodiment may, for example, select a display region to which a coverage region including the pointed position is allocated. Examples of the coverage region according to the present embodiment can include a region which includes a display region and is larger than the display region, and which is a region not overlapped with other coverage regions.

Further, the information processing apparatus according to the present embodiment can also select a display region, for example, on the basis of priority set for each of the plurality of display regions. The information processing apparatus according to the present embodiment, for example, selects a display region with higher set priority. Further, in the case where there exist a plurality of display regions with the same priority, the information processing apparatus according to the present embodiment selects a display region in which the pointed position is first included in the determination region among the plurality of display regions.

Here, the priority set for each of the plurality of display regions is set, for example, as follows. Note that a setting method of the priority according to the present embodiment is not limited to the examples described below, and the priority according to the present embodiment may be set using an arbitrary method with which the priority can be set.

Higher priority is set as a distance between a position of the projection device and a position of the pointing device 18 is closer.

Higher priority is set as a distance between a position of the display region and the position of the pointing device 18 is closer.

Higher priority is set as a size of the display region (for example, a projection size of the display region) is larger.

Higher priority is set for a display region with higher definition when the display region is projected.

Higher priority is set for a display region for which operation is to be performed soon.

The processing associated with setting of the priority according to the present embodiment may be performed by the information processing apparatus according to the present embodiment or may be performed by an external apparatus of the information processing apparatus according to the present embodiment.

The information processing apparatus according to the present embodiment or the external apparatus specifies a distance between one position and the other position by utilizing an arbitrary technology which can specify (or estimate) a distance, such as, for example, a method utilizing detected data of a distance sensor and a method utilizing a captured image. Further, the information processing apparatus according to the present embodiment or the external apparatus specifies the size of the display region or definition when the display region is projected using an arbitrary method such as a method utilizing a control parameter, or the like, of the projection device 10. Still further, the information processing apparatus according to the present embodiment or the external apparatus specifies a display region for which operation is to be performed soon by, for example, managing identification information (such as, for example, an ID) of the display region for which operation is to be performed soon in a recording medium, or the like.

FIG. 11 is an explanatory diagram for explaining an example of the information processing method according to the present embodiment and illustrates an example of a method for selecting a display region in the case where there exist a plurality of display regions.

In the case where there exist a plurality of projectors within space, a display region is selected using a method for selecting a display region as illustrated in, for example, FIG. 11.

Here, when there exist a plurality of display regions within space, there can be a case where the plurality of display regions include an overlapping region.

In the case where the information processing apparatus according to the present embodiment automatically selects a display region as described above, even if the plurality of display regions include an overlapping region, one display region is selected.

Further, in the case where the information processing apparatus according to the present embodiment selects a display region on the basis of the above-described user operation relating to selection of a display region, the information processing apparatus according to the present embodiment can select one display region, for example, on the basis of information indicating front-behind relationship of display set for the display regions.

Figures 12A, 12B:
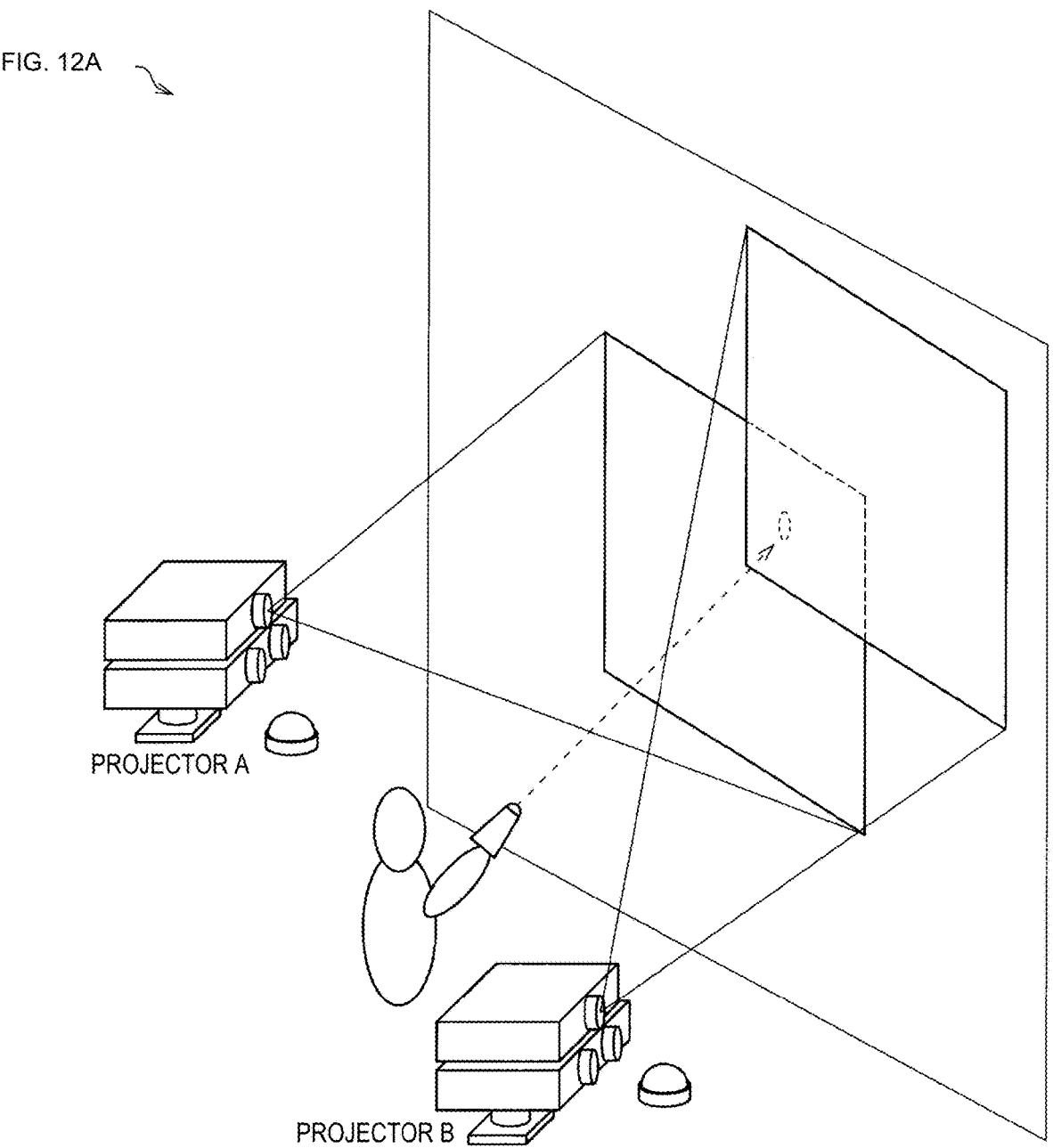
FIGS. 12A and 12B are explanatory diagrams for explaining an example of the information processing method according to the present embodiment.

FIGS. 12A and 12B are explanatory diagrams for explaining an example of the information processing method according to the present embodiment. FIG. 12A illustrates a case where a plurality of display regions include an overlapping region, and the overlapping region is pointed, and FIG. 12B illustrates an example of the information indicating front-behind relationship of display.

The information indicating front-behind relationship of display illustrated in FIG. 12B indicates that a display region projected by the projector with smaller number is displayed at the front. The number indicating the front-behind relationship indicated by the information indicating the front-behind relationship of display illustrated in FIG. 12B corresponds to priority for selecting a display region, and the information processing apparatus according to the present embodiment selects a display region displayed at the front, which is a display region with high priority.

For example, as illustrated in FIG. 12A, in the case where the user points a region where the two display regions overlap, the information processing apparatus according to the present embodiment selects a display region projected from a projector A which is a display region displayed at the front with reference to the information indicating the front-behind relationship of display illustrated in FIG. 12B.

(III) Notification Control Processing

The information processing apparatus according to the present embodiment can perform feedback to the user by, for example, performing notification control processing as described in the following (A) to (C).

(A) First Example of Notification Control Processing

The information processing apparatus according to the present embodiment controls notification of the mode selected in the selection processing (the display control mode or the execution mode. The same will apply below.), that is, notification of a selection result in the selection processing.

The information processing apparatus according to the present embodiment makes a visual notification of the mode selected in the selection processing (the selection result in the selection processing) by, for example, changing display of the display region. The information processing apparatus according to the present embodiment makes a visual notification of the mode selected in the selection processing by, for example, transmitting a signal including a control command to the projection device 10, the display device, or the like.

Note that the information processing apparatus according to the present embodiment can also make an auditory notification of the mode selected in the selection processing by outputting sound (including music) from a sound output device such as a speaker.

FIGS. 13A, 13B, 13C, 13D, and 13E are explanatory diagrams for explaining an example of the information processing method according to the present embodiment and illustrates an example of visual feedback by the notification control processing according to the first example.

The information processing apparatus according to the present embodiment makes a visual notification of the mode selected in the selection processing through, for example, the following visual feedback. Note that it goes without saying that an example of the visual feedback is not limited to the following examples.

Notification by changing color of a boundary of the display region (FIG. 13A)

Notification by selectively adding a gradation effect to the display region (FIG. 13B)

Notification by changing color or a rate of permeability of the whole display region (FIG. 13C)

Notification by changing the shape of the display region (FIG. 13D)

Notification by changing a display position and the shape of the cursor (for example, in the execution mode, the cursor is displayed at the pointed position, and, in the display control mode, the cursor is displayed at an end portion of the display region corresponding to a moving direction of the display region, and the shape of the cursor is changed. FIG. 13E)

(B) Second Example of Notification Control Processing

The information processing apparatus according to the present embodiment makes a notification that a current display region includes a non-planar region, for example, the display region is displayed at a non-planar portion, or part of the display region includes concavity and convexity.

FIGS. 14A, 14B, 14C, and 14D are explanatory diagrams for explaining an example of the information processing method according to the present embodiment and illustrates an example of the visual feedback by the notification control processing according to the second example. FIG. 14A illustrates an example of display of the display region in the case where visual feedback is not performed. Further, FIGS. 14B, 14C, and 14D illustrate examples of display of the display region in the case where visual feedback is performed.

The information processing apparatus according to the present embodiment makes a visual notification that a current display region includes a non-planar region through, for example, the following visual feedback. Note that an example of the visual feedback is not limited to the following examples.

Notification by changing one or both of color and a rate of permeability of the non-planar region (FIG. 14B)

Notification by displaying the non-planar region in a wire-mesh pattern to indicate that the image is distorted by the non-planar portion (FIG. 14C)

Notification by encouraging change of the display position of the display region by indicating an arrow in a direction of a region where the display region can be displayed (for example, a planar region where the display region can be displayed) (FIG. 14C)

(C) Third Example of Notification Control Processing

The information processing apparatus according to the present embodiment, for example, makes a notification that the pointed position cannot be detected.

Here, examples of the case where the pointed position cannot be detected can include, for example, a case where, while it is detected that the user performs pointing, the pointed position cannot be detected from a captured image, or the like, acquired from the infrared fisheye camera 16.

FIGS. 15A, 15B, and 15C are explanatory diagrams for explaining an example of the information processing method according to the present embodiment and illustrates an example of visual feedback by the notification control processing according to the third example. FIG. 15A illustrates an example of display of the display region in the case where visual feedback is not performed. Further, FIGS. 15B and 15C illustrate examples of display of the display region in the case where visual feedback is performed.

The information processing apparatus according to the present embodiment makes a visual notification that the pointed position cannot be detected through, for example, the following visual feedback. Note that it goes without saying that an example of the visual feedback is not limited to the following examples.

An alert using characters, an image, or the like, is displayed (FIG. 15A)

The whole display region or a boundary of the display region is flickered (FIG. 15B)

Further, the information processing apparatus according to the present embodiment can also make an auditory notification that the pointed position cannot be detected.

[3] An Example of Effects Provided by Using the Information Processing Method According to the Present Embodiment By the information processing method according to the present embodiment being used, effects as described in, for example, the following (a) to (e) can be provided.

(a) The user can dynamically change display of the display region by operation of one operation system.

(b) The user can change a position, or the like, where the display region is to be displayed or can execute processing corresponding to the display object within the display region by operation of one operation system.

(c) The user can seamlessly switch between change of a position, or the like, where the display region is to be displayed and execution of processing corresponding to the display object within the display region by operation of one operation system. Therefore, operation in accordance with conditions of the user can be realized by operation of one operation system.

(d) By the above-described effect of (c), for example, it is possible to provide an "environment in which an image can be projected at an optimal position in accordance with posture as well as the position of the user in the room, and the user can operate content in the image using optimal input means".

(e) Because the display control mode or the execution mode is selected on the basis of positional relationship between the pointed position and the determination region, the user can seamlessly switch between the two modes. Therefore, the user can perform operation more intuitively.

The information processing apparatus according to the present embodiment, for example, performs the "above-described selection processing" or "one or more types of processing among the above-described selection processing, the above-described processing in accordance with the selected mode, the above-described processing (I), the above-described processing (II) and the above-described processing (III)" as the processing associated with the information processing method according to the present embodiment.

Note that each of the "above-described selection processing" and the "one or more types of processing among the above-described selection processing, the above-described processing in accordance with the selected mode, the above-described processing (I), the above-described processing (II) and the above-described processing (III)" is a type of processing divided from the processing associated with the information processing method according to the present embodiment for convenience sake. Therefore, in the processing associated with the information processing method according to the present embodiment, for example, the "one or more types of processing among the above-described selection processing, the above-described processing in accordance with the selected mode, the above-described processing (I), the above-described processing (II) and the above-described processing (III)" can be regarded as one type of processing. Further, in the processing associated with the information processing method according to the present embodiment, for example, each of the "one or more types of processing among the above-described selection processing, the above-described processing in accordance with the selected mode, the above-described processing (I), the above-described processing (II) and the above-described processing (III)" can be regarded as two or more types of processing (in accordance with an arbitrary way of dividing the processing).

(Information Processing Apparatus According to the Present Embodiment)

An example of a configuration of the information processing apparatus according to the present embodiment which can perform the above-described processing associated with the information processing method according to the present embodiment will be described next.

Figure 16:
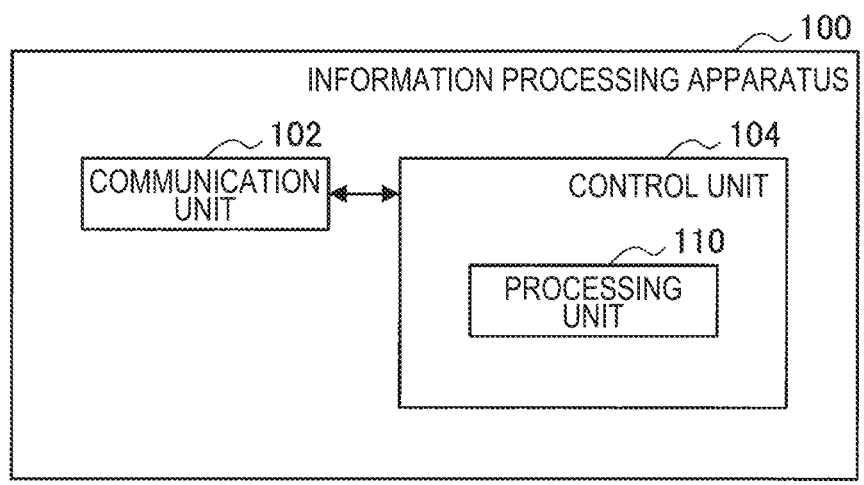
FIG. 16 is a block diagram illustrating an example of a configuration of an information processing apparatus according to the present embodiment.

FIG. 16 is a block diagram illustrating an example of the configuration of the information processing apparatus 100 according to the present embodiment. The information processing apparatus 100 includes, for example, a communication unit 102 and a control unit 104.

Further, the information processing apparatus 100 may include, for example, a read only memory (ROM, which is not illustrated), a random access memory (RAM, which is not illustrated), a storage unit (which is not illustrated), an operation unit (which is not illustrated) which can be operated by the user, a display unit (which is not illustrated) which displays various screens on a display screen, or the like. The information processing apparatus 100, for example, connects the above-described respective components using a bus which is a data transmission path.

The ROM (which is not illustrated) stores control data such as a program and an operation parameter to be used by the control unit 104. The RAM (which is not illustrated) temporarily stores a program to be executed by the control unit 104.

The storage unit (which is not illustrated), which is storage means provided at the information processing apparatus 100, for example, stores data associated with the information processing method according to the present embodiment such as information indicating front-behind relationship of display and various kinds of data such as various kinds of application. Here, examples of the storage unit (which is not illustrated) can include, for example, a magnetic recording medium such as a hard disk, and a nonvolatile memory such as a flash memory. Further, the storage unit (which is not illustrated) may be detachable from the information processing apparatus 100.

Examples of the operation unit (which is not illustrated) can include an operation input device which will be described later. Further, examples of the display unit (which is not illustrated) can include a display device which will be described later.

[Hardware Configuration Example of Information Processing Apparatus 100]

Figure 17:
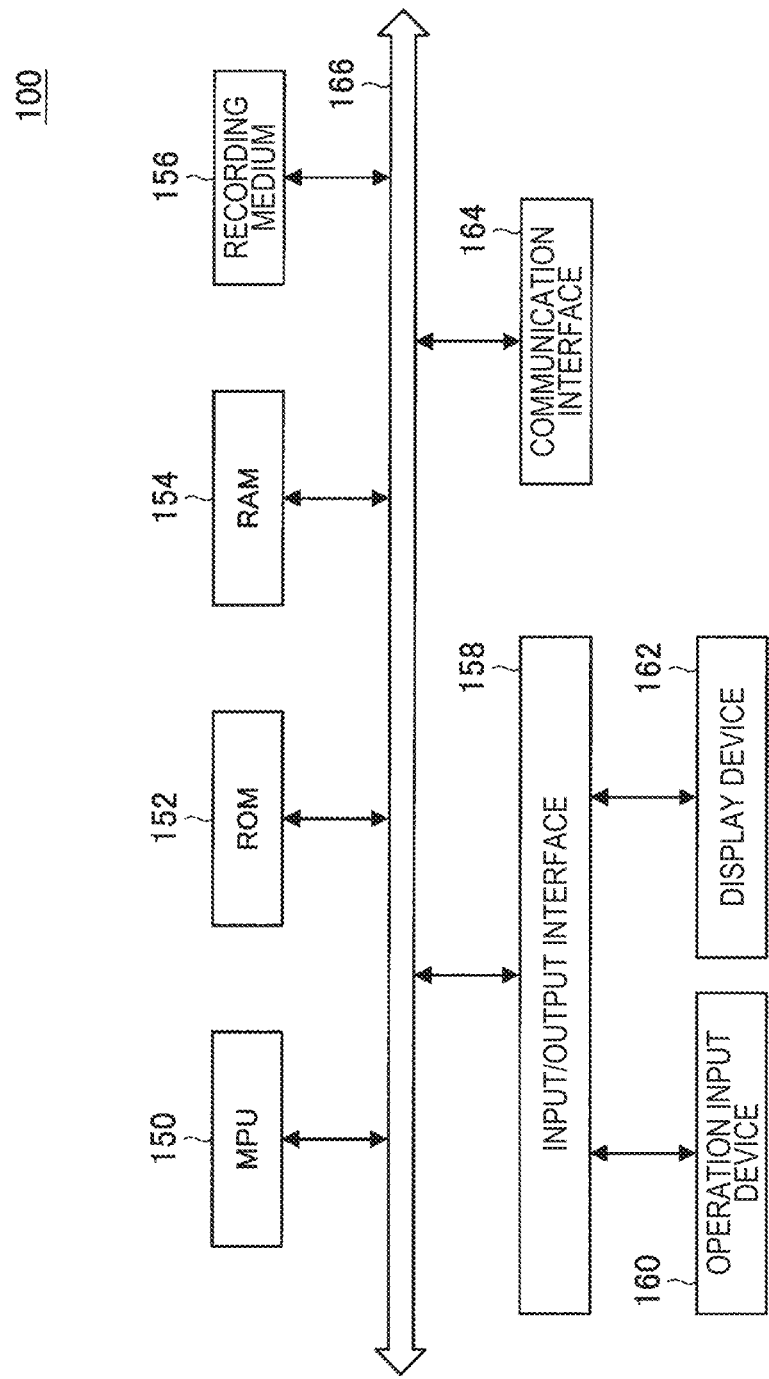
FIG. 17 is an explanatory diagram illustrating an example of a hardware configuration of the information processing apparatus according to the present embodiment.

FIG. 17 is an explanatory diagram illustrating an example of a hardware configuration of the information processing apparatus 100 according to the present embodiment. The information processing apparatus 100 includes, for example, an MPU 150, a ROM 152, a RAM 154, a recording medium 156, an input/output interface 158, an operation input device 160, a display device 162 and a communication interface 164. Further, the information processing apparatus 100 connects the respective components using a bus 166 which is a data transmission path.

The MPU 150 includes, for example, one or more processors including an arithmetic circuit such as an MPU, various kinds of processing circuits, or the like, and functions as a control unit 104 which controls the whole of the information processing apparatus 100. Further, the MPU 150 plays a role of, for example, a processing unit 110 which will be described later, in the information processing apparatus 100. Note that the processing unit 110 may include a dedicated (or general-purpose) circuit (such as, for example, a processor separate from the MPU 150) which can realize processing of each unit.

The ROM 152 stores control data such as a program and an operation parameter, or the like, to be used by the MPU 150. The RAM 154 temporarily stores a program, or the like, to be executed by the MPU 150.

The recording medium 156 functions as a storage unit (which is not illustrated) and, for example, stores data associated with the information processing method according to the present embodiment such as information indicating the front-behind relationship of display and various kinds of data such as various kinds of application. Here, examples of the recording medium 156 can include, for example, a magnetic recording medium such as a hard disk, and a nonvolatile memory such as a flash memory. Further, the recording medium 156 may be detachable from the information processing apparatus 100.

The input/output interface 158, for example, connects the operation input device 160 and the display device 162. The operation input device 160 functions as an operation unit (which is not illustrated), and the display device 162 functions as a display unit (which is not illustrated). Here, examples of the input/output interface 158 can include, for example, a universal serial bus (USB) terminal, a digital visual interface (DVI) terminal, a high-definition multimedia interface (HDMI) (registered trademark) terminal and various kinds of processing circuits.

Further, the operation input device 160, for example, is provided on the information processing apparatus 100, and is connected to the input/output interface 158 inside the information processing apparatus 100. Examples of the operation input device 160 can include, for example, a button, a direction key, a rotary selector such as a jog dial or combination thereof.

Further, the display device 162 is, for example, provided on the information processing apparatus 100 and is connected to the input/output interface 158 inside the information processing apparatus 100. Examples of the display device 162 can include, for example, a liquid crystal display, an organic electro-luminescence (EL) display, and an organic light emitting diode (OLED) display.

Note that it goes without saying that the input/output interface 158 can be connected to an external device such as an external operation input device (such as, for example, a keyboard and a mouse) and an external display device of the information processing apparatus 100. Further, the display device 162 may be a device which can perform display and allow user operation, such as, for example, a touch panel.

The communication interface 164, which is communication means provided at the information processing apparatus 100, functions as a communication unit 102 for performing communication via a network (or directly) in a wireless or wired manner with devices constituting the system associated with the operation environment according to the present embodiment such as, for example, the projection device 10, the infrared camera 12, the actuation device 14, the infrared fisheye camera 16 and the pointing device 18, and external apparatuses such as a server. Here, examples of the communication interface 164 can include, for example, a communication antenna and a radio frequency (RF) circuit (wireless communication), an IEEE802.15.1 port and a transmission/reception circuit (wireless communication), an IEEE802.11 port and a transmission/reception circuit (wireless communication) and a local area network (LAN) terminal and a transmission/reception circuit (wired communication).

The information processing apparatus 100 performs the processing associated with the information processing method according to the present embodiment according to the configuration illustrated in, for example FIG. 17. Note that the hardware configuration of the information processing apparatus 100 according to the present embodiment is not limited to the configuration illustrated in FIG. 17.

For example, in the case where the information processing apparatus 100 performs communication with an external apparatus, or the like, via a connected external communication device, the information processing apparatus 100 does not have to include the communication interface 164. Further, the communication interface 164 may have a configuration so as to be able to perform communication with one or more external apparatuses, or the like, using a plurality of communication schemes.

Further, the information processing apparatus 100 can, for example, employ a configuration which does not include the recording medium 156, the operation input device 160 and the display device 162.

Further, in the case where the information processing apparatus 100 is a device constituting the system associated with the operation environment according to the present embodiment, the information processing apparatus 100 can, for example, include components for realizing functions of the device.

Further, for example, part or all of the components illustrated in FIG. 17 (or components according to a modified example) may be implemented with one or more integrated circuits (ICs).

Referring to FIG. 16 again, an example of the configuration of the information processing apparatus 100 will be described. The communication unit 102, which is communication means provided at the information processing apparatus 100, performs communication via a network (or directly) in a wireless or wired manner with devices constituting the system associated with the operation environment according to the present embodiment, and external apparatuses such as a server. Further, communication of the communication unit 102 is controlled by, for example, the control unit 104.

Here, while examples of the communication unit 102 can include, for example, a communication antenna and an RF circuit, and a LAN terminal and a transmission/reception circuit, the configuration of the communication unit 102 is not limited to the above-described examples. For example, the communication unit 102 can employ a configuration supporting an arbitrary standard which enables communication, such as a USB terminal and a transmission/reception circuit, and an arbitrary configuration which enables communication with external apparatuses via a network. Further, the communication unit 102 may have a configuration so as to be able to perform communication with one or more external apparatuses using a plurality of communication schemes.

The control unit 104, which includes, for example, an MPU, plays a role of controlling the whole of the information processing apparatus 100. Further, the control unit 104 includes, for example, a processing unit 110 and plays a role of leading the processing associated with the information processing method according to the present embodiment.

The processing unit 110 plays a role of leading the processing associated with the information processing method according to the present embodiment, and performs the above-described selection processing. Further, the processing unit 110 can further perform one or more types of processing among the above-described processing in accordance with the selected mode, the above-described processing (I), the above-described processing (II) and the above-described processing (III).

The control unit 104 includes, for example, the processing unit 110, and thereby leads the processing associated with the information processing method according to the present embodiment (for example, the "above-described selection processing" or "one or more types of processing among the above-described selection processing, the above-described processing in accordance with the selected mode, the above-described processing (I), the above-described processing (II) and the above-described processing (III)").

The information processing apparatus 100 performs the processing associated with the information processing method according to the present embodiment (for example, the "above-described selection processing" or "one or more types of processing among the above-described selection processing, the above-described processing in accordance with the selected mode, the above-described processing (I), the above-described processing (II) and the above-described processing (III)") according to the configuration illustrated in, for example, FIG. 16.

Therefore, the information processing apparatus 100 can realize improvement of operability of the user according to the configuration illustrated in, for example, FIG. 16.

Further, the information processing apparatus 100 can provide an effect provided by the processing associated with the information processing method according to the present embodiment as described above being performed according to the configuration illustrated in, for example, FIG. 16.

Note that the configuration of the information processing apparatus according to the present embodiment is not limited to the configuration illustrated in FIG. 16.

For example, the information processing apparatus according to the present embodiment can include the processing unit 110 illustrated in FIG. 16 separately from the control unit 104 (for example, implements the processing unit 110 with a separate processing circuit).

Further, as described above, each of the "above-described selection processing" and "one or more types of processing among the above-described selection processing, the above-described processing in accordance with the selected mode, the above-described processing (I), the above-described processing (II) and the above-described processing (III)" is processing divided from the processing associated with the information processing method according to the present embodiment for convenience sake. Therefore, the configuration for implementing the processing associated with the information processing method according to the present embodiment is not limited to the configuration illustrated in FIG. 16, and may be a configuration in accordance with a way of dividing the processing associated with the information processing method according to the present embodiment.

Further, for example, in the case where communication is performed with an external apparatus via an external communication device having functions and a configuration similar to those of the communication unit 102, the information processing apparatus according to the present embodiment does not have to include the communication unit 102.

While the present embodiment has been described above using an example of the information processing apparatus, the present embodiment is no limited to such an embodiment. The present embodiment can be applied to various kinds of equipment which can perform the processing associated with the information processing method according to the present embodiment, such as, for example, a computer such as a personal computer (PC) and a server, a communication apparatus such as a mobile phone and a smartphone, and a tablet-type apparatus. Further, the present embodiment may be a device which constitutes the system associated with the operation environment according to the present embodiment, such as, for example, the projection device 10, the infrared camera 12, the actuation device 14, the infrared fisheye camera 16 and the pointing device 18. Still further, the present embodiment can be also applied to, for example, a processing IC which can be incorporated into the equipment as described above.

Further, the information processing apparatus according to the present embodiment may be applied to an information processing system assuming connection to a network (or communication among respective apparatuses) as with, for example, cloud computing. Examples of the information processing system in which the processing associated with the information processing method according to the present embodiment is performed can include, for example, a "system in which the display control mode or the execution mode is selected by one apparatus which performs the selection processing according to the present embodiment, and change of a position, or the like, where the display region is to be displayed and execution of processing corresponding to a display object within the display region are switched and performed by the other apparatus which performs the processing in accordance with the selected mode according to the present embodiment".

(Program According to the Present Embodiment)

By a program for causing a computer to function as the information processing apparatus according to the present embodiment (for example, a program which can execute the processing associated with the information processing method according to the present embodiment such as the "above-described selection processing" or "one or more types of processing among the above-described selection processing, the above-described processing in accordance with the selected mode, the above-described processing (I), the above-described processing (II) and the above-described processing (III)") being executed by a processor, or the like, at the computer, it is possible to realize improvement of operability of the user.

Moreover, when a program that causes a computer to function as the information processing apparatus according to the present embodiment is executed by a processor or the like in the computer, it is possible to provide an effect provided by the processing related to the information processing method according to the present embodiment described above.

The preferred embodiment of the present disclosure has been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it has been illustrated above that a program (computer program) that causes a computer to function as the information processing apparatus according to the present embodiment is provided, but the present embodiment can further provide a recording medium in which the above-described program is stored together.

The above-described configurations express examples of the present embodiment and, of course, pertain to the technical scope of the present disclosure.

Note that the effects described above are not necessarily limitative. With or in the place of the above effects, there may be achieved any one of the effects described in this specification or other effects that may be grasped from this specification.

Additionally, the present technology may also be configured as below.

(1)

An information processing apparatus including:

a processing unit configured to perform switching processing on a basis of a determination result as to whether or not a determination region determined on a basis of a display region which becomes a target of operation of one operation system includes a pointed position pointed in response to the operation, the switching processing being processing of switching between a display control mode for changing a position or a shape of the display region on a basis of the operation and an execution mode for executing processing corresponding to a display object within the display region on a basis of the operation, in which the display region indicates a unit when the position or the shape of the display region is changed in the display control mode.

(2)

The information processing apparatus according to (1), in which the processing unit selects the execution mode in a case where the pointed position is included in the determination region, and selects the display control mode in a case where the pointed position is located outside the determination region.

(3)

The information processing apparatus according to (1) or (2), in which the determination region is a region which is larger than the display region and which includes the display region.

(4)

The information processing apparatus according to (1) or (2), in which the determination region is a region identical to the display region.

(5)

The information processing apparatus according to (1) or (2), in which the display region is a displayable region which is a limit region where a display apparatus which displays the display region is able to display video at a time.

(6)

The information processing apparatus according to any one of (1) to (5), in which the processing unit further performs processing in accordance with the display control mode switched in the switching processing or processing in accordance with the execution mode switched in the switching processing.

(7)

The information processing apparatus according to (6), in which, in a case where the display control mode is selected, the processing unit displays the display region at a position corresponding to the pointed position.

(8)

The information processing apparatus according to (7), in which, in a case where the processing unit is not able to cause the display region to be displayed at the position corresponding to the pointed position, the processing unit causes the display region to be displayed at a position where the display region is able to be displayed.

(9)

The information processing apparatus according to any one of (1) to (8), in which, when the pointed position is changed from a position outside the determination region to a position within the determination region in a case where the switching is not performed, the processing unit causes content corresponding to the pointed position located outside the determination region to be displayed in the display region.

(10)

The information processing apparatus according to any one of (1) to (9), in which, in a case where there exist a plurality of the display regions, the processing unit performs the switching on the display region selected among the plurality of display regions.

(11)

The information processing apparatus according to (10), in which the processing unit selects the display region on a basis of user operation.

(12)

The information processing apparatus according to (10) or (11), in which the processing unit selects the display region in which the pointed position is first included in the determination region, among the plurality of display regions.

(13)

The information processing apparatus according to (10) or (11), in which the processing unit selects the display region on a basis of priority set for each of the plurality of display regions.

(14)

The information processing apparatus according to (13), in which the processing unit sets the priority and selects the display region on a basis of the set priority.

(15)

The information processing apparatus according to any one of (10) to (14), in which the plurality of display regions include an overlapping region.

(16)

The information processing apparatus according to any one of (1) to (15), in which the processing unit further performs notification control processing of controlling notification of a switching result in the switching processing.

(17)

The information processing apparatus according to (16), in which the processing unit makes a visual notification of a switching result in the switching processing.

(18)

An information processing method executed by an information processing apparatus, the method including:

a step of performing processing on a basis of a determination result as to whether or not a determination region determined on a basis of a display region which becomes a target of operation of one operation system includes a pointed position pointed in response to the operation, the processing being processing of switching between a display control mode for changing a position or shape of the display region on a basis of the operation and an execution mode for executing processing corresponding to a display object within the display region on a basis of the operation, in which the display region indicates a unit when the position or the shape of the display region is changed in the display control mode.

(19)

A program causing a computer to implement a function of performing processing on a basis of a determination result as to whether or not a determination region determined on a basis of a display region which becomes a target of operation of one operation system includes a pointed position pointed in response to the operation, the processing being processing of switching between a display control mode for changing a position or shape of the display region on a basis of the operation and an execution mode for executing processing corresponding to a display object within the display region on a basis of the operation, in which the display region indicates a unit when the position or the shape of the display region is changed in the display control mode.

REFERENCE SIGNS LIST

100 information processing apparatus
102 communication unit 104 control unit
110 processing unit

The invention claimed is:

1. An information processing apparatus, comprising:
a processing unit configured to:
determine a determination region on a display region;
switch the information processing apparatus between a display control mode and an execution mode based on a location of a pointed position with respect to the determination region, wherein the pointed position corresponds to a specific position on the display region;
control at least one of a position of the display region or a shape of the display region in the display control mode, wherein the at least one of the position of the display region or the shape of the display region is controlled based on a first user operation; and
execute a first process that processes a display object in the execution mode, wherein
the first process is executed based on the first user operation, and
the display object is within the display region.

2. The information processing apparatus according to claim 1, wherein the processing unit is further configured to:
select the execution mode based on the pointed position that is in the determination region; and
select the display control mode based on the pointed position that is outside the determination region.

3. The information processing apparatus according to claim 2, wherein
the determination region includes the display region.

4. The information processing apparatus according to claim 2, wherein the determination region is identical to the display region.

5. The information processing apparatus according to claim 2, wherein the display region is a displayable region.

6. The information processing apparatus according to claim 1, wherein the processing unit is further configured to execute a second process based on one of the display control mode or the execution mode.

7. The information processing apparatus according to claim 6, wherein the position of the display region is based on the pointed position.

8. The information processing apparatus according to claim 1, wherein
the processing unit is further configured to change a display position of content corresponding to the pointed position from a first position that is outside the determination region to a second position that is inside the determination region, and
the display position of the content is changed based on the pointed position that is changed from the first position to the second position.

9. The information processing apparatus according to claim 1, wherein the processing unit is further configured to select the display region from a plurality of display regions.

10. The information processing apparatus according to claim 9, wherein the processing unit is further configured to select the display region based on a second user operation.

11. The information processing apparatus according to claim 9, wherein the processing unit is further configured to select the display region based on the pointed position that is in the determination region.

12. The information processing apparatus according to claim 9, wherein the processing unit is further configured to select the display region based on a priority associated with each of the plurality of display regions.

13. The information processing apparatus according to claim 12, wherein the processing unit is further configured to:
set the priority of each of the plurality of display regions; and
select the display region based on the set priority.

14. The information processing apparatus according to claim 9, wherein the plurality of display regions includes an overlapping region.

15. The information processing apparatus according to claim 1, wherein the processing unit is further configured to notify the switch between the display control mode and the execution mode.

16. The information processing apparatus according to claim 15, wherein the processing unit is further configured to generate a visual notification of a result of the switch between the display control mode and the execution mode.

17. An information processing method, comprising:
in an information processing apparatus:
determining a determination region on a display region;
switching the information processing apparatus between a display control mode and an execution mode based on a location of a pointed position with respect to the determination region, wherein the pointed position corresponds to a specific position on the display region;
controlling at least one of a position of the display region or a shape of the display region in the display control mode, wherein the at least one of the position of the display region or the shape of the display region is controlled based on a user operation; and
executing a process that processes a display object in the execution mode, wherein
the process is executed based on the user operation, and
the display object is within the display region.

18. A non-transitory computer-readable medium having stored thereon, computer-executable instructions which, when executed by a computer, cause the computer to execute operations, the operations comprising:
determining a determination region on a display region;
switching an information processing apparatus between a display control mode and an execution mode based on a location of a pointed position with respect to the determination region, wherein the pointed position corresponds to a specific position on the display region;
controlling at least one of a position of the display region or a shape of the display region in the display control mode, wherein the at least one of the position of the display region or the shape of the display region is controlled based on a user operation; and
executing a process that processes a display object in the execution mode, wherein
the process is executed based on the user operation, and
the display object is within the display region.

* * * * *